(12) United States Patent
Iden et al.

(10) Patent No.: US 7,827,918 B2
(45) Date of Patent: Nov. 9, 2010

(54) MOUNTING OF DRAG REDUCING DEVICES FOR STACKED INTERMODAL RAIL CARS

(75) Inventors: Michael E. Iden, Kildeer, IL (US); Wayne A. Kennedy, Mondamin, IA (US); Matthew M. Larson, Omaha, NE (US); John P. Haenggi, Elkhorn, NE (US)

(73) Assignee: Union Pacific Railroad Company, Houston, TX (US)

( * ) Notice: Subject to any disclaimer, the term of this patent is extended or adjusted under 35 U.S.C. 154(b) by 0 days.

(21) Appl. No.: 12/259,029

(22) Filed: Oct. 27, 2008

(65) Prior Publication Data

US 2009/0278382 A1 Nov. 12, 2009

Related U.S. Application Data

(63) Continuation-in-part of application No. 12/118,393, filed on May 9, 2008.

(51) Int. Cl.
*B61D 17/00* (2006.01)
(52) U.S. Cl. .................. 105/1.1; 296/181.5; 410/69
(58) Field of Classification Search ................ 105/1.1, 105/1.2, 1.3; 296/180.1, 180.2, 181.1, 181.5
See application file for complete search history.

(56) References Cited

U.S. PATENT DOCUMENTS

| | | | |
|---|---|---|---|
| 2,101,619 A | 12/1937 | Lentz | |
| 2,108,203 A | 2/1938 | Lentz | |
| 2,148,078 A | 2/1939 | Lentz | |
| 2,256,493 A | 9/1941 | Radsdale | |
| D179,222 S | 11/1956 | Schaus | |
| D220,220 S | 3/1971 | Joy | |
| 3,934,922 A * | 1/1976 | MacCready et al. | 296/180.4 |
| 4,030,779 A | 6/1977 | Johnson | |
| 4,057,280 A | 11/1977 | MacCready, Jr. | |
| 4,210,354 A * | 7/1980 | Canning | 296/180.4 |
| 4,236,745 A | 12/1980 | Davis | |
| 4,326,745 A | 12/1980 | Davis | |

(Continued)

FOREIGN PATENT DOCUMENTS

JP     5-270402     10/1993

OTHER PUBLICATIONS

Photograph of EMD GP60 diesel freight locomotive, obtained from http://www.rrpicturearchives.net/showPicture.aspx?id=185887.

*Primary Examiner*—S Joseph Morano
*Assistant Examiner*—Jason C Smith
(74) *Attorney, Agent, or Firm*—Pillsbury Winthrop Shaw Pittman LLP

(57) ABSTRACT

Disclosed is a series of stacked intermodal containers, being pulled by a locomotive of a train, with aerodynamic drag reducing devices. A first set of containers has an aerodynamic drag reducing device with a drag reducing fairing and an attachment frame attached thereto. The attachment frame includes first and second mounting devices configured to be removably mounted to connection openings of the corner fittings of the top container of the first set of containers. The first mounting device(s) may be rotatably locked within the top connection openings, while the second mounting device (s) may be hooks for latching into the bottom connection openings. A method of attaching the aerodynamic drag reducing device is also disclosed.

14 Claims, 18 Drawing Sheets

U.S. PATENT DOCUMENTS

| | | | | |
|---|---|---|---|---|
| 4,257,640 A * | 3/1981 | Wiley | | 296/180.3 |
| 4,343,505 A * | 8/1982 | Levassor | | 296/180.2 |
| 4,441,751 A * | 4/1984 | Wesley | | 296/180.1 |
| 4,626,155 A * | 12/1986 | Hlinsky et al. | | 410/82 |
| 4,702,509 A * | 10/1987 | Elliott, Sr. | | 296/180.4 |
| 4,738,203 A | 4/1988 | Gielow | | |
| 4,746,160 A * | 5/1988 | Wiesemeyer | | 296/180.2 |
| 4,756,256 A * | 7/1988 | Rains et al. | | 105/1.1 |
| 4,909,154 A | 3/1990 | Walker | | |
| 4,993,125 A * | 2/1991 | Capron et al. | | 24/287 |
| 5,222,438 A | 6/1993 | Ende | | |
| 5,355,806 A | 10/1994 | Bieber | | |
| 5,465,669 A * | 11/1995 | Andrus | | 105/1.1 |
| 5,560,088 A * | 10/1996 | Nitsche et al. | | 24/287 |
| 5,562,374 A * | 10/1996 | Plamper | | 410/66 |
| 5,570,981 A * | 11/1996 | Brewster | | 410/70 |
| 5,577,449 A * | 11/1996 | Kleiner et al. | | 105/26.05 |
| 5,676,271 A * | 10/1997 | Reynard | | 220/1.5 |
| 6,286,894 B1 * | 9/2001 | Kingham | | 296/181.5 |
| 6,519,816 B1 * | 2/2003 | Tagaguchi et al. | | 24/287 |
| 6,692,203 B2 * | 2/2004 | Kim et al. | | 410/69 |
| 6,877,793 B2 * | 4/2005 | Cory | | 296/180.1 |
| 6,959,958 B2 * | 11/2005 | Basford | | 296/180.1 |
| 7,008,005 B1 * | 3/2006 | Graham | | 296/180.4 |
| 7,017,508 B2 | 3/2006 | Vanmoor | | |
| 7,114,898 B2 * | 10/2006 | Brewster | | 410/70 |
| 7,178,846 B2 * | 2/2007 | Niskanen | | 294/81.54 |
| 7,207,620 B2 * | 4/2007 | Cosgrove et al. | | 296/180.4 |
| 7,484,918 B2 * | 2/2009 | Brewster | | 410/69 |
| 7,510,358 B2 * | 3/2009 | Brewster | | 410/69 |
| 2004/0239146 A1 * | 12/2004 | Ortega et al. | | 296/180.2 |
| 2005/0139115 A1 * | 6/2005 | Harada et al. | | 105/1.1 |
| 2005/0242601 A1 * | 11/2005 | Niskanen | | 294/81.54 |
| 2005/0258330 A1 * | 11/2005 | Brewster | | 248/500 |
| 2007/0212182 A1 * | 9/2007 | Brewster | | 410/82 |
| 2007/0212183 A1 * | 9/2007 | Brewster | | 410/82 |
| 2008/0256767 A1 * | 10/2008 | Berns et al. | | 27/35 |
| 2008/0309122 A1 * | 12/2008 | Smith et al. | | 296/180.1 |
| 2009/0047090 A1 * | 2/2009 | Brewster | | 410/80 |
| 2009/0123250 A1 * | 5/2009 | Brewster | | 410/82 |
| 2009/0179456 A1 * | 7/2009 | Holubar | | 296/180.4 |
| 2010/0102574 A1 * | 4/2010 | Brewster et al. | | 292/229 |

* cited by examiner

MOUNTING OF DRAG REDUCING DEVICES FOR STACKED INTERMODAL RAIL CARS

RELATED ART

The present application is a continuation-in-part of Ser. No. 12/118,393 to Iden et al. filed on May 9, 2008, the entirety of which is hereby incorporated by reference into the present application.

BACKGROUND

1. Field of Invention

The present invention is generally related to reducing aerodynamic drag on stacked intermodal containers.

2. Description of Related Art

Generally the use of stacked (or "double stacked") intermodal containers, wherein a top container is mounted on a bottom container, is known as a method of transporting goods on rail. For example, as shown in FIG. 1 and further described in detail below, a series 104 of stacked intermodal containers may be provided on stack cars 113 and pulled by a locomotive 102 along a rail 103 to form a train used for transporting goods on land. Though transporting intermodal containers in a double stack assists in lowering rail haul costs, it would be beneficial to further reduce such costs associated with rail transportation. For example, the expenses associated with operating a fuel (e.g., diesel) powered locomotive may significantly increase based on rising gas prices. Additionally, exhaust emissions of diesel fuel may cause damage and be harmful to the environment.

SUMMARY

One aspect of the invention provides a system for reducing aerodynamic drag of a series of stacked intermodal containers. The series has at least a first set of containers with a top container stacked above a bottom container. Each of the containers has a top wall, a bottom wall, front wall, back wall, and side walls connected by a frame. Each container also has connection openings at each corner. The system includes an aerodynamic drag reducing device with a drag reducing fairing attached to an attachment frame. The attachment frame includes a first mounting device and a second mounting device, each extending rearwardly therefrom. The first and second mounting devices of the attachment frame are configured to be removably mounted to the connection openings the top container of the first set of containers.

Another aspect of the invention includes a method for reducing aerodynamic drag of a series of stacked intermodal containers. The series has at least a first set of containers with a top container stacked above a bottom container. Each of the containers has a top wall, a bottom wall, front wall, back wall, and side walls connected by a frame. Each container also has connection openings at each corner. The method of reducing drag includes providing an aerodynamic drag reducing device having a drag reducing fairing attached to an attachment frame and removably mounting the attachment frame using a first mounting device and a second mounting device each extending rearwardly from the attachment frame to the connection openings of the top container of the first set of containers.

One aspect of the invention provides a train having a locomotive and a series of stacked intermodal containers. The series has at least a first set of containers and a second set of containers, and each set of containers has a top container stacked above a bottom container. Each of the containers has a top wall, a bottom wall, front wall, back wall, and side walls connected by a frame. Each container has corner fittings at each corner. The corner fittings have a plurality of connection openings. The first set of containers has an aerodynamic drag reducing device with a drag reducing fairing and an attachment frame attached thereto. The fairing is attached to the attachment frame, and the attachment frame has at least one mounting device extending rearwardly therefrom. The at least one mounting device of the attachment frame is configured to be removably mounted to the connection openings of the corner fittings of the top container of the first set of containers.

In another aspect of the invention, a method of attaching an aerodynamic drag to a set of stacked intermodal containers is provided. The aerodynamic drag reducing device has a drag reducing fairing and an attachment frame. The fairing is attached to the attachment frame. The set of containers has a top container stacked above a bottom container. Each of the containers has a top wall, a bottom wall, a front wall, a back wall, and side walls connected by a frame. Each container also has connection openings at each corner. The method includes: positioning the aerodynamic drag reducing device in relation to the top container and aligning the attachment frame with at least one connection opening of the top container. The attachment frame includes a first mounting device and a second mounting device each extending rearwardly therefrom. The method also includes inserting at least the first mounting device into the at least one connection opening, and securing at least the first mounting device in the at least one connection opening.

Other objects, features, and advantages of the present invention will become apparent from the following detailed description, the accompanying drawings, and the appended claims.

DETAILED DESCRIPTION OF THE PREFERRED EMBODIMENT(S)

It is a goal of the present invention to reduce the amount of aerodynamic drag and vortices created among a series of stacked intermodal containers during transportation. Though intermodal containers are designed to be used in more than one form of transportation, e.g., railway, waterway, or highway, the embodiments below are herein described pertaining to their use on a railway.

Figure 1:
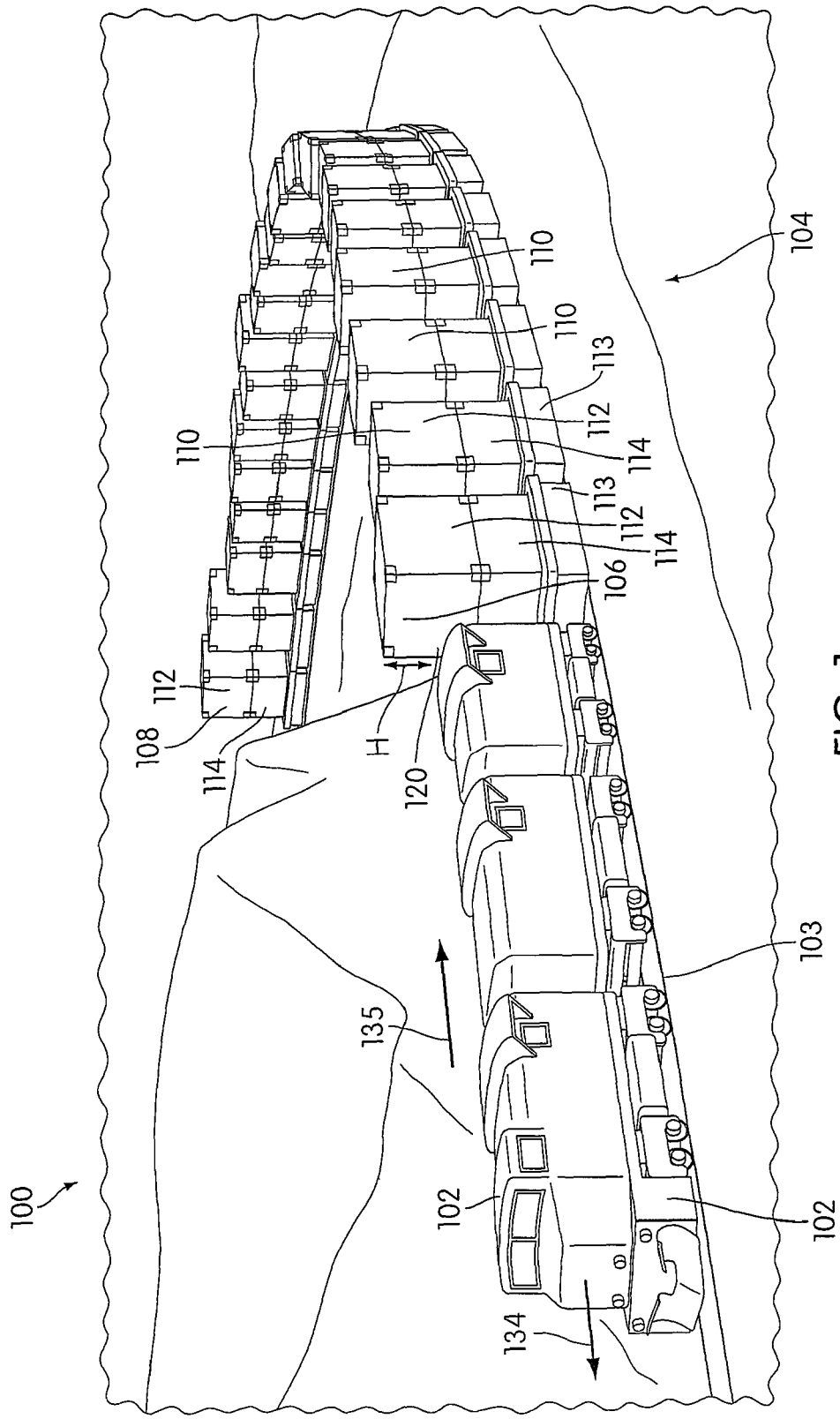
FIG. 1 illustrates a train comprising a locomotive pulling a series of stacked intermodal containers.

Referring now more particularly to the drawings, FIG. 1 illustrates a train 100 comprising a locomotive 102 pulling a series 104 of stacked intermodal containers, as previously noted. The locomotive 102 may be a vehicle that is diesel-powered to pull the series 104 of stacked intermodal containers on railroad tracks or rails 103, as is known in the art. As shown, the series 104 has at least a first set 106 of stacked intermodal containers and at least a second set of stacked intermodal containers 108. In an embodiment, the first set 106 of containers is defined as a first, leading set of containers attached and adjacent to the locomotive 102. In an embodiment, the second set 108 of containers may be the last or trailing set of containers in the series 104 of containers in the train 100. Alternatively, and more typically, a plurality of intermediate sets of stacked intermodal containers 110 is also be provided between the first set 106 and the second set 108. In an embodiment, one of the intermediate sets 110 of containers may be referred to as a second set. In another embodiment, a trailing set of containers may be referred to as the first set of containers.

Each set 106-110 of stacked intermodal containers is provided on a stack car 113, for example. The stack car 113, also known as a double stack car, is a railroad car that is designed to carry intermodal containers. The stack cars 113 are connected in series and are pulled (or pushed) by one or more locomotives 102.

Each set 106-110 of stacked intermodal containers comprises a top container 112 stacked or mounted on a bottom container 114, also referred to herein as a double stack. The mounting and/or locking of top and bottom containers 112 and 114, respectively, to each other in a stack is generally known in the art, as is discussed further below. It is noted that a container, as herein described, is defined as a box container, bulk container, tank, or other storage device comprising a structure or frame that allows for stacking and mounting on top of one another. Generally such containers are also referred to as "ISO containers," as they are manufactured according to specifications from the International Standards Organization (ISO) and are suitable for multiple transportation methods such as truck and rail, or rail and ship. For example, a known standard for such containers is ISO 1496. In an embodiment, each of the containers 112, 114 comprises a top wall 116, a bottom wall 118, front wall 120, back wall 122, and side walls 124 connected by a frame 126 to form an enclosed box, for example (shown throughout the Figures). The containers as described herein may comprise various sizes and features. As generally known in the art, the side walls may comprise doors or openings allowing access to contents being held therein. The doors may be provided on a back wall, near the rear of the container, near the front of the container, on the sides of the container, or even access via the top of the container. Alternatively, a top wall may not be included. The dimensions or sizes of the containers should also not be limiting. For example, standard ISO shipping containers comprising dimensions of 10 to 53 feet long, 8 feet to 9 feet 6 inches high, and 8 feet wide may be used for transportation. Additionally, the type of product held by the containers should not be limiting. For example, though a box container is generally described herein, the device may be used with bulk containers typically 20 to 28 feet long and/or tanks designed to hold liquids with a holding capacity of 4000-6000 gallons.

Also, a structure or frame 126 of each of the containers or tanks may also facilitate stacking. Each container also comprises corner fittings 125 at each corner comprising a plurality of connection openings 125a or apertures, such as shown in detail in FIG. 5. The connection openings 125a are commonly used to connect or releasably lock the top container 112 to the bottom container 114 when mounted on each other to form a stack/double stack, for example. The connection openings 125a may also be used to lift a container. The connection openings 125a of the corner fittings 125 comprise an opening, hole, or aperture for receiving a securing, clamping, or connecting device. The opening, hole, or aperture 125a may be circular, oval, or any other shape, although they are typically elongated in shape. The corner fittings 125 are also designed to meet ISO standards and/or specifications. The corner fittings 125 may be made from a number of materials including, but not limited to, aluminum, stainless steel, and carbon steel. Generally, eight (8) corner fittings 125 are provided on a container (two top right, two top left, two bottom right, two bottom left).

In order to lock two intermodal containers together (or lock a container to a railcar such as stack car 113, or lock a lift to a container), it is commonly known to use devices known as twist locks (not shown). Twist locks are safety locking mechanisms and may be manually or automatically actuated. Twist locks are designed to be inserted into the connection openings 125a of corner fittings 125 of a top and bottom container 112 and 114, for example, and are twisted or rotated to lock a head portion within the connection opening 125a. Specifically, the twist lock has a shaft with an elongated head that aligned with and is inserted into an opening 125a. The head is then pivoted out of alignment with opening 125a to prevent its withdrawal and provide the locking action. Other container connector clamps that are known in the art may also be used. Twist locks or connector clamps may be made of any number of materials, such as steel or galvanized steel, and are not designed to be limiting. As will be described with respect to FIGS. 5 and 10-16, a locking device similar to a twist lock may be used to lock an aerodynamic drag reducing device 140 to the corner fittings 125 of a top container 112.

When the series 104 of stacked intermodal containers are received on rail cars 112 attached to a locomotive 102, for example, as shown in FIG. 1, the series 104 of double stacked intermodal containers of the train 100 generally protrude a distance or a height H above the locomotive 102. For example, the height H may be five to six feet above the highest point or height of the locomotive 102. Such a height difference provides a significant source of aerodynamic drag while pulling the series 104 of containers in a forward direction (as indicated by arrow 134). As the containers are pulled in a forward direction 134, the air flow (as indicated by arrow 135) creates drag in an opposite direction. Some wind tunnel studies have shown, for example, that the first 20% of a train 100 produces the most drag. Thus, a transition between locomotive 102 and first set 106 of containers that assists in reducing the overall aerodynamic drag of the train 100 would be beneficial. Additionally, air forces or vortices may be formed around the edges of and between the adjacent sets of containers when moving in a forward 134 direction at high speeds. Attaching additional aerodynamic drag reducing devices as further described herein to reduce the drag and vortices of the stacked intermodal containers of the train 100 while moving thus provides a plurality of benefits.

Figure 2:
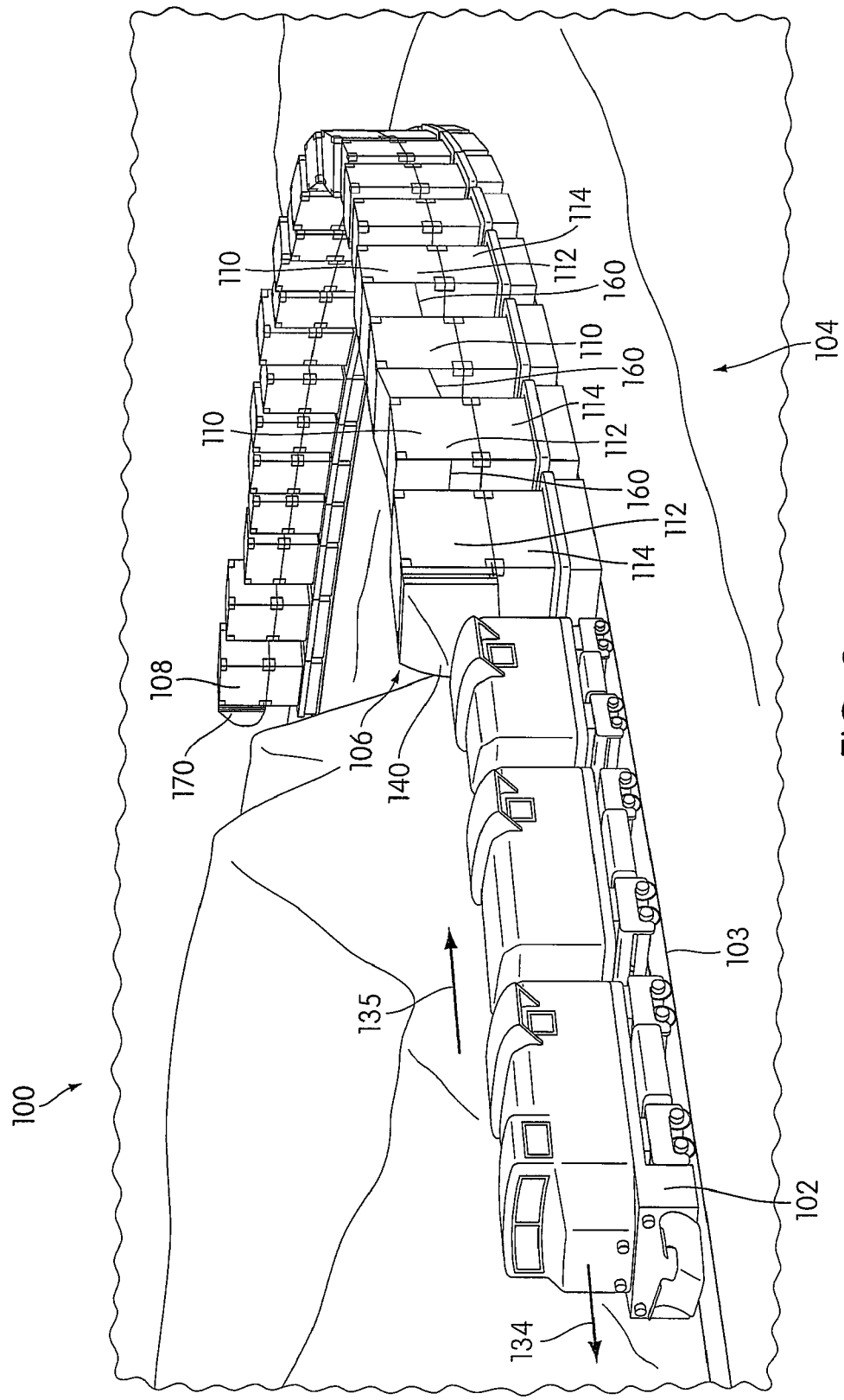
FIG. 2 illustrates the train of FIG. 1 comprising a system of aerodynamic drag reducing devices in accordance with an embodiment of the present invention.

FIG. 2 illustrates the train 100 of FIG. 1 comprising a system of aerodynamic drag reducing devices in accordance with an embodiment of the present invention. In an embodiment, at least one aerodynamic drag reducing device 140 may be provided on the first set 106 of stacked intermodal containers to assist in reducing the amount of drag of a moving train 100. In an embodiment, the aerodynamic drag reducing device 140 is mounted to the top container 112 of the first set 106 of double stacked train of intermodal containers. The aerodynamic drag reducing device 140 comprises a fairing 142 and an attachment frame 130. In the embodiment of FIG. 2, the fairing 142 is attached to the top container 112 at a first end 127 such that as the train 100 moves in a forward direction 134, air coming up and over the locomotive 102 may be directed over the top of at least the first set 106 of containers in the series 104, thus reducing the resistance or drag. The attachment frame 130 is designed to attach or mount the fairing 142 onto first or front ends 127 of the top container 112. The fairing 142 is attached to at least a part of the attachment frame 130.

However, it should be noted that it is envisioned in other embodiments that the aerodynamic drag reducing device 140 may be attached to a back or second end 128 of a set of containers as well. For example, as noted above, the second set 108 of containers may be referred to as a first set of containers. In addition or alternatively to the drag reducing device 140 on the first set 106 of containers, FIG. 2 also illustrates a perspective view of an aerodynamic drag reducing device or tail 170 attached to a back wall 122 of at least a top container 112 of a trailing set 108 of stacked intermodal containers which may be used in accordance with an embodiment of the present invention. The tail 170 also reduces the vortices produce by the air flow 135 when the train 100 or series 104 of stacked intermodal containers are moving in a forward direction 134. In an embodiment, the second, aerodynamic drag reducing device or tail 170 may comprise a similar structure as the front-mounted aerodynamic drag reducing device 140 as described above. For example, the tail 170 may be designed to comprise an attachment frame with a first and a second mounting device extending therefrom. The mounting devices of the attachment frame may then be aligned with and inserted into the corner fittings 125 of the top container 112 of the set 108 of stacked containers to mount the tail 170 to a container 112. For example, the mounting of tail 170 may be performed in a similar manner as described with respect to the aerodynamic drag reducing device 140, and/or may use similar attachment structures (including the first and second mounting devices 136 and 146) for securement to the corner fittings 125.

Figure 4:
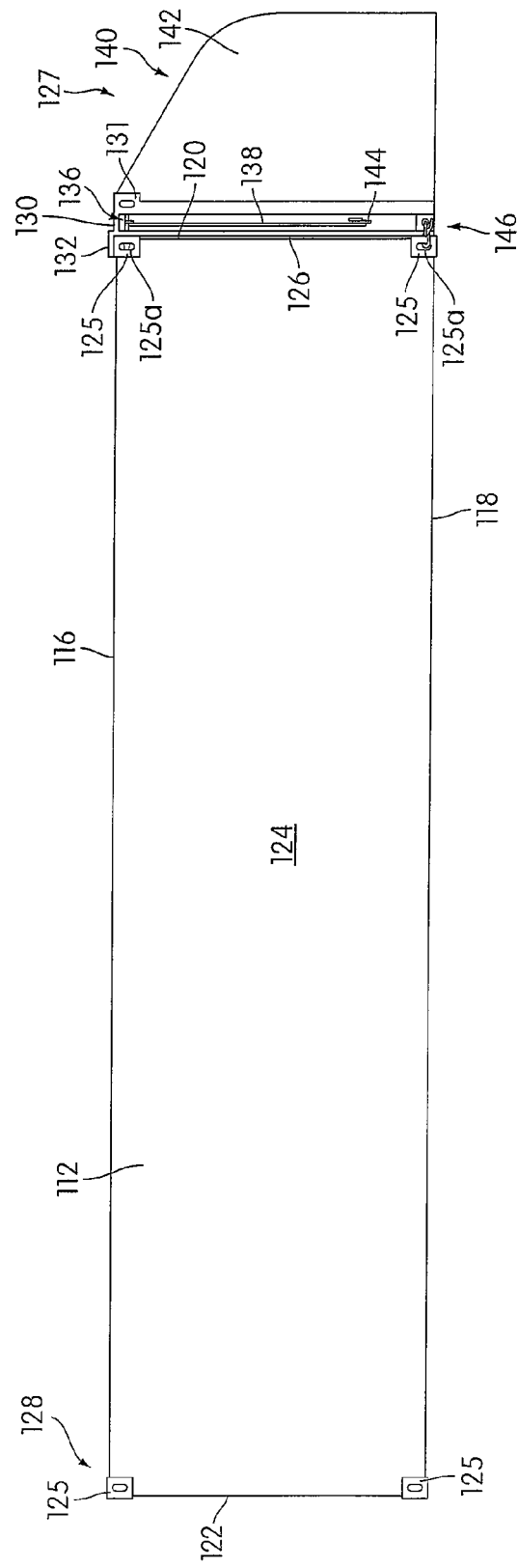
FIG. 4 illustrates a side view of the container and aerodynamic drag reducing device of FIG. 3 in accordance with an embodiment of the present invention.

The type of fairing used with aerodynamic drag reducing device 140 may include any number of shapes, sizes, and/or materials and should be limiting. For example, in some embodiments, the fairing 142 comprises at least one radiused edge. In an embodiment, the fairing 142 may comprise a first, substantially rounded end at the top thereof (e.g., to be mounted near the top wall 116 of a container) that extends downwardly toward a second end near the bottom (e.g., to be mounted near the bottom wall 118 of a container), such as shown in FIG. 4. In an embodiment, the fairing 142 comprises a lightweight material that is able to withstand the aerodynamic forces to which it will be subjected (e.g., withstands forces of 12-mph head winds when moving in a forward direction 134). For example, the fairing 142 may comprise fiberglass materials. In some instances, the fairing 142 may form a shroud.

In an embodiment, the aerodynamic drag reducing device 140 is designed to utilize the corner fittings 125 of the top container 112 of the first set 106 of stacked intermodal containers for mounting. More specifically, when a top container 112 is stacked on a bottom container 114, the corner fittings 125 of the top container 112 are substantially unrestricted and provide accessible openings for securely mounting the device 140 thereto. Specifically, the holes or connection openings 125a of the corner fittings 125 provided on the front and side walls 116, 120 on the top and bottom of the top container 112 are unrestricted. Utilizing the corner fittings 125 for attachment or mounting of the drag reducing device 140 is beneficial as the corner fittings 125 are existing devices and no modification needs to be made to the container 112 or its frame 126.

In order to secure the fairing 142 of the drag reducing device 140 to the corner fittings 125, the attachment frame 130 is provided with a first mounting device 136 and a second mounting device 146. The first mounting device 136 and second mounting device 146 each extend outwardly from the frame 130 and are designed to be inserted and locked in the connection openings 125a of corner fittings 125 of the top container 112. First mounting devices 136 are provided in the top right and top left corners of the frame 130, while second mounting devices 146 are provided in the bottom right and bottom left corners of the frame 130.

Figure 5:
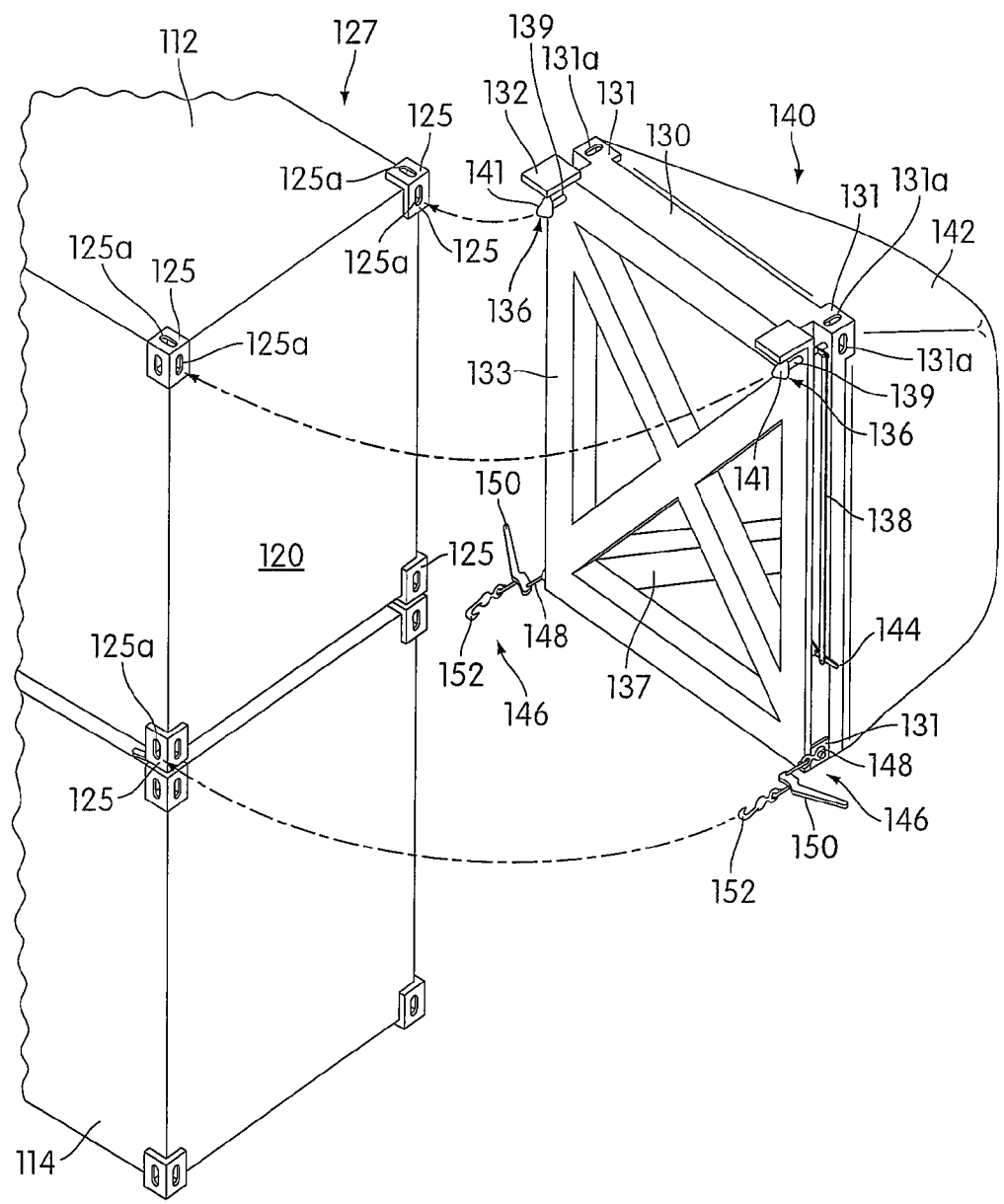
FIG. 5 illustrates a perspective view of the method of attaching the aerodynamic drag reducing device to a top container of a set of containers in accordance with an embodiment of the present invention.

FIG. 5 illustrates a perspective view of an attachment frame 130 with first and second mounting devices 136, 146 in such positions which are used to attach the aerodynamic drag reducing device 140 to the top container 112 of the first set 106 of stacked intermodal containers in accordance with an embodiment of the present invention. The attachment frame 130 comprises a frame structure 133 with corner assemblies 131, and support plates 132, for example. The frame structure 133 generally comprises a body of substantially polygonal shape. In some embodiments, the frame structure 133 may comprise a substantially rectangular or substantially square shape. In some embodiments, the structure 133 may be formed to be of substantially similar size and shape as a container, for example. The structure 133 of the frame 130 may also have support braces that extend diagonally across its body for additional support.

The attachment frame 130 may also include a skirt portion 137 that extends from the bottom of the frame structure 133 to assist in supporting the fairing 142. The skirt portion 137 extends in a generally forward direction from the frame structure 133 and may be formed into any number of shapes. The fairing 142 is securely attached to the skirt 137 in any number of ways (e.g., bolts, nuts, screws). Generally, the fairing 142 is designed to be attached along the base of the skirt 137 and across a bottom of the skirt 137 and attachment frame 130 to assist in its aerodynamic drag reducing capabilities. The fairing 142 is also attached to frame structure 133 at its rear end.

The attachment frame 130 also includes corner assemblies 131. Corner assemblies 131 are provided to assist in mounting the aerodynamic drag reducing device 140 to a container, as will be further described below. Corner assemblies 131 are provided in at least a top portion of structure 133 of the attachment frame 130. Corner assembles 131 may also be provided near or in a bottom portion of the attachment frame 130. For example, corner assemblies 131 in the bottom portion may be used to assist in attaching a second mounting device 146 to the attachment frame 130. In an embodiment, corner assemblies 131 comprise at least one opening 131a. As shown in FIG. 5, openings 131a may be provided on a top portion and a side portion of each of the corner assemblies 131. Corner assemblies 131 may comprise a design similar to the corner fittings 125 of intermodal containers, for example. In particular, having openings 131a that are essentially the same as openings 125a on the container enables the device 140 to be lifted into position by the same lift equipment used for lifting the containers 120 (as the same twist lock engagement can be made between the lift and openings 125a and 131a). However, the location and designs of the openings and corner assemblies should not be limited. In an embodiment, corner assemblies 131 may be manufactured using known methods such as casting. In an embodiment, corner assemblies 131 may be made of materials such as steel or other metals. The materials and manufacturing methods used for the corner assemblies 131 should not be limiting.

Figure 3:
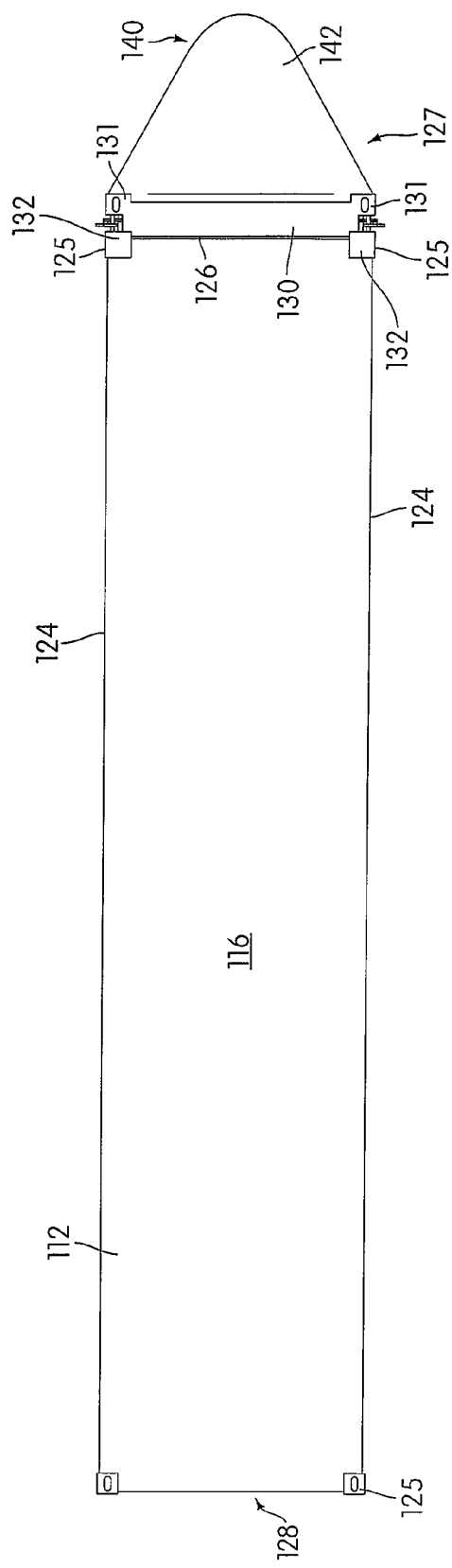
FIG. 3 illustrates a top view of a container having an aerodynamic drag reducing device attached thereto in accordance with an embodiment of the present invention.

Generally adjacent the corner assemblies 131 are support plates 132. Support plates 132 are provided at the top right and top left corners of the attachment frame 130. Support plates 132 extend rearwardly with respect to the structure 133 and/or attachment frame 130. The support plates 132 are provided to help support the weight of the aerodynamic drag reducing device 140 when it is attached to a container. Additionally, support plates 132 may assist in the attaching the device 140 to the container by acting as locating or guide devices for an operator. The support plates 132 are designed such that they rest on the top surface of the corner fittings 125 provided at the top corners of a top container 112 when the attachment frame 130 is properly mounted and substantially flush with the front wall 120 of the container 112. Support plates 132 may cover the top connection openings 125a of the corner fittings 125, for example, as shown in FIG. 3. As shown in FIG. 5, the support plates 132 are provided above a first mounting device 136; thus, the support plates 132 may also aid in protecting the first mounting device 136 from damage.

In some instances, the support plates 132 may comprise alignment pins 143. As shown in FIGS. 6-11, the alignment pins 143 may be provided on a lower side of the plates 132, extending in a generally downward, vertical direction. The alignment pins 143 may be used aid in guiding the attachment of the drag reducing device 140 to the front of the container 112. When the attachment frame 130 is properly aligned, the alignment pins 143 are inserted into the top connection openings 125a provided at the top right and top left corner fittings 125 at the first end 127 of the top container 112. The alignment pins 143 are designed such that their dimensions do not interfere with the manipulation or mounting of the first mounting device 136.

It should be noted that the design of the attachment frame 130, structure 133, skirt portion 137, corner assemblies 131, and/or support plates 132 should not be limited to those mentioned, and it is envisioned that several designs may be used. Additionally, the materials used to manufacture the attachment frame 130 should not be limiting. For example, in some embodiments, the attachment frame 130 may comprise materials such as aluminum or other metals. In some embodiments, the structure 133, skirt 137 and/or frame 130 may be formed of hollow tubing.

Figure 13:
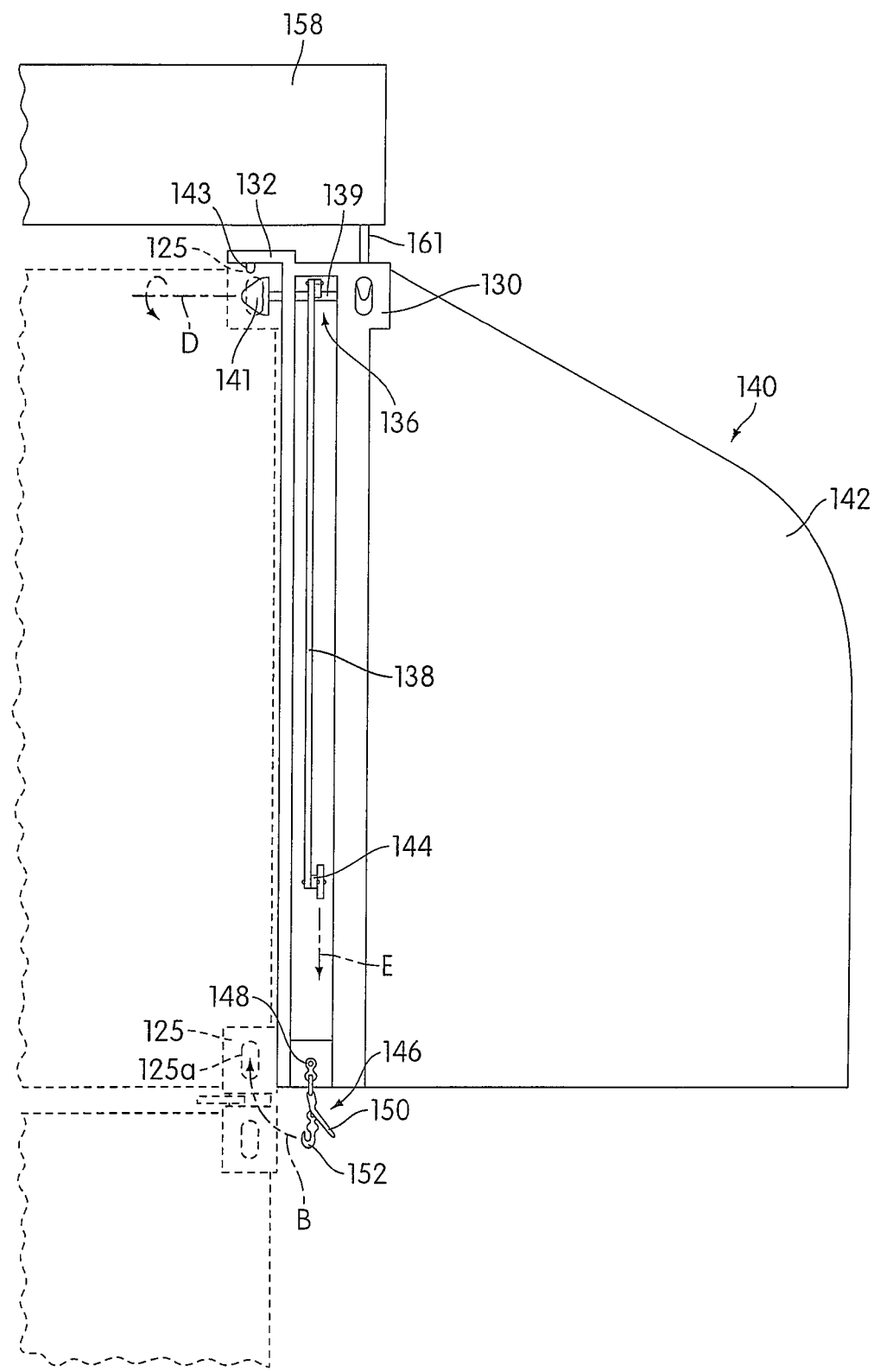
FIGS. 13-14 illustrate detailed side views of securing a first mounting device and a second mounting device to connection openings of a container in accordance with an embodiment of the present invention.

As shown in FIGS. 5 and 13, first mounting device 136 extends rearwardly from the attachment frame 130. The first mounting device 136 is designed such that it may be inserted into and locked securely within the top corner fittings 125 of the top container 112 of the first set 106 of containers. Specifically, the first mounting device 136 may be inserted into the front connection opening 125a located along the front face (e.g., along the front wall 120) of the top corner fittings 125 (e.g., top left and top right) of the container 112 (however, as noted above, the first mounting device 136 may also be attached adjacent the back wall 122 of a container). The first mounting device 136 may comprise a design substantially similar to the twist lock devices (not shown) that are used to attach intermodal containers, discussed above. However, the first mounting devices 136 are uniquely designed to twist or rotate about a horizontal axis, and are not necessarily compliant with ISO standards. In some embodiments, the first mounting device 136 may comprise a rotatable base 139 and a rotatable locking head 141 to releasably secure the attachment frame 130 of the device 140 in the connection openings 125a. Generally, the rotatable base 139 comprises a rotatable shaft that is rotatable or pivotable in at least two directions about a substantially horizontal axis. For simplicity purposes only, the base 139 is depicted as merely comprising a rotatable shaft. However, it should be noted that the rotatable base 139 may comprise any number of shapes, designs, parts, or other devices that may pivot or rotate about a substantially horizontal axis, and should not be limited to the illustrated design. The rotatable base 139 or shaft is designed to be pivoted or rotated about the horizontal axis to rotate locking head 141 between an unlocked position and a locked position. In some instances, the rotatable base 139 may comprise a toggle pin which is designed to rotate about an axis of 90 degrees. More specifically, the base or toggle pin 139 may rotate between an unlocked position (e.g., at zero degrees), and a locked position (e.g., at 90 degrees), or vice versa.

The locking head 141, as shown in FIG. 5, comprises a substantially tapered, oblong shape. The locking head 141 is designed such that it maybe easily inserted into the connection openings 125a of the corner fittings 125 of a container. In some embodiments, the locking head 141 may be of substantially similar shape to that of the connection opening 125a of the corner fitting 125. Although the tapered, oblong shape of the locking head 141 assists in inserting and locking the first mounting device 136 in a corner fitting 125, the shape of the locking head 141 should not be limited. In some instances, the locking pin 141 may also be considered a bayonet pin which is designed to rotate about an axis of 90 degrees, under the guidance of the rotatable base 139. For example, the locking head 141 may be rotated between an unlocked position (e.g., at zero degrees), and a locked position (e.g., at 90 degrees), or vice versa. In some embodiments, the shape of the locking head 141, such as its base, may be altered. For example, if the opening 125a and the base of the locking head 141 comprise a substantially oblong shape, the locking head 141 may be easily inserted therein. However, when the locking head 141 is rotated or twisted, its base may be shaped such that it prevents the head 141 from being removed or withdrawn from the opening 125a.

In some embodiments, the locking head 141 may be manually actuated. The locking head 141 may be rotated from an unlocked position to a locked position, or vice versa, via a toggle arm 138. The toggle arm 138 may be provided within or parallel to the structure 133 of the attachment frame 130, for example. A first end of the toggle arm 138 is attached to the shaft of the rotatable base 139, while a second end of the toggle arm 138 is pivotally attached to the structure 133. The toggle arm 138 is designed such that force applied to move the arm 138 in an upward or downward direction is directly transferred to the rotatable base 139. That is, when the toggle arm 138 is moved in a downward direction, the rotatable base 139 will rotate in a first direction. When the toggle arm 138 is moved in an upward direction, the rotatable base 139 will rotate in a second, opposite direction. The rotation of the rotatable base 139 directly rotates the locking head 141. Thus, as a user or operator applies force to the toggle arm 138, the user or operator rotates the locking head 141 in an unlocking or locking direction.

The toggle arm 138 may include a toggle handle 144 to assist the user in rotating the locking device 141. The toggle handle 144 is located adjacent or near the second end of the toggle arm 138 and is generally pivotable about a point such that the locking device 141 is rotated between an unlocked and locked position. The toggle handle 144 may extend outwardly from the structure 133 so as to provide easy access for a user or operator. Preferably, the handle 144 is closer to the bottom of the frame structure 133 than the top, and may be below more than 60%, 75%, 80% or 90% of the distance between the top and bottom of the frame structure 133. This lowered position makes it easier for the user to reach and operate the handle 144. That is, the handle 144 may be positioned to be accessed directly from the deck or yard, without the need for ladders or other assisting devices.

Although the illustrated embodiment as described above shows manual actuation of the device, it is also envisioned that the first mounting device 136 may also be automatically actuated, or, alternatively, have an assisted actuation (e.g. electromechanical) from an unlocked to a locked position, or vice versa. Thus, the actuation of the first mounting device 136 should not be limited.

The second mounting device 146 also extends rearwardly from the attachment frame 130. Each second mounting device 146 comprises at least a hook 152 extending from a bottom portion of the attachment frame 130 which is used to latch into the connection openings 125a of the corner fittings 125 at the bottom of the container. As shown in FIG. 4, the hook 152 may be inserted into the bottom connection opening 125a on a side face (e.g., along the side wall 124) of the bottom corner fittings 125 (e.g., bottom right and bottom left) of the container 112. Generally, the bottom connection openings 125a on the side walls 124 of a container are not used for railroad services.

In an embodiment, the second mounting device 146 also comprises an attachment linkage 148 and a leverage handle 150. The linkage 148, leverage handle 150, and hook 152 may be part of a device known as a lever load binder. The second mounting device 146 enables a user or operator to insert the hook 152 into a connection opening 125a and appropriately tighten the grip of the hook 152 via the pivoting movement of the handle 150. An end of the linkage 148 may be attached to a corner assembly 131 located at the bottom of the attachment frame 130, for example, while the other end of the link 148 may be attached to the leverage handle 150. The leverage handle 150 is designed to cooperatively work with linkage 148 and hook 152 such that when, after insertion of the hook 152 into a bottom connection opening 125a, the leverage handle 150 is moved from a first position to a second position, the hook 152 is tightened and securely fastened in the connection opening 125a.

However, it should be noted that the leverage handle 150 need not be used or provided. For example, as shown and described further in FIG. 17, when the hook 152 of the second mounting device 146 is extended to reach a corner opening 125b of a container 112a, the handle 150 may not be needed for securing the device.

In an embodiment, any type of releasable clamping or locking device may be provided for releasably securing the second mounting device 146 to the corner fittings 125. The releasable clamping devices may be activated in any number of ways and should not be limiting.

FIGS. 6-7 and 10-12 illustrate side views of the attachment of the aerodynamic drag reducing device 140 to the top container 112 of a first, leading set 106 of stacked intermodal containers of a train 100 using a lift device 154 in accordance with an embodiment. For simplicity purposes, a right or near side of the containers and devices are shown. However, it is to be understood that the described mounting devices 136 and 146 and methods of attaching such devices should be understood to reference a left or far side of the containers and related devices as well.

Figure 6:
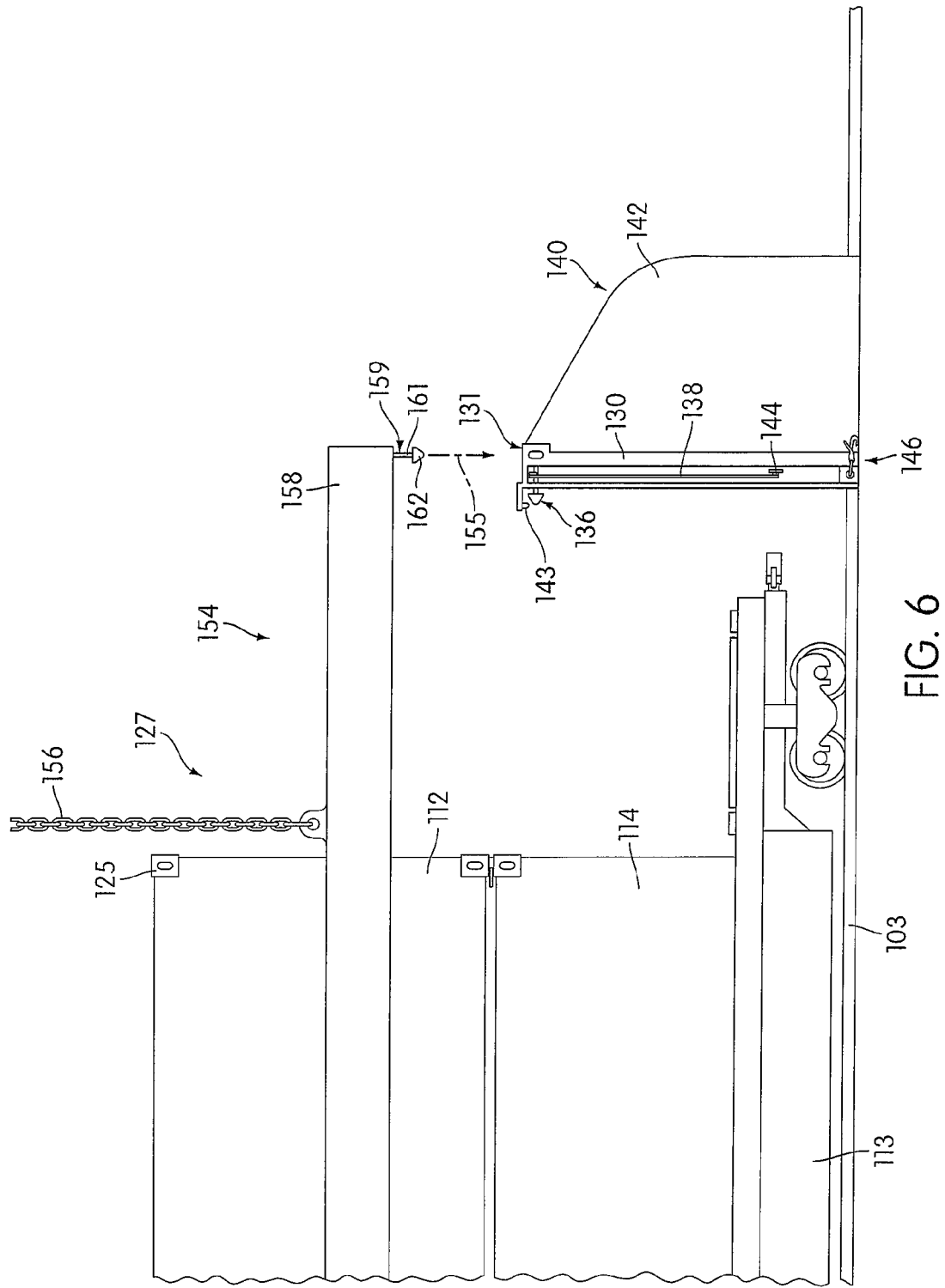
FIGS. 6 and 7 illustrate a side view of the method of attaching the aerodynamic drag reducing device to the top container using a lift device in accordance with an embodiment of the present invention.
Figure 7:
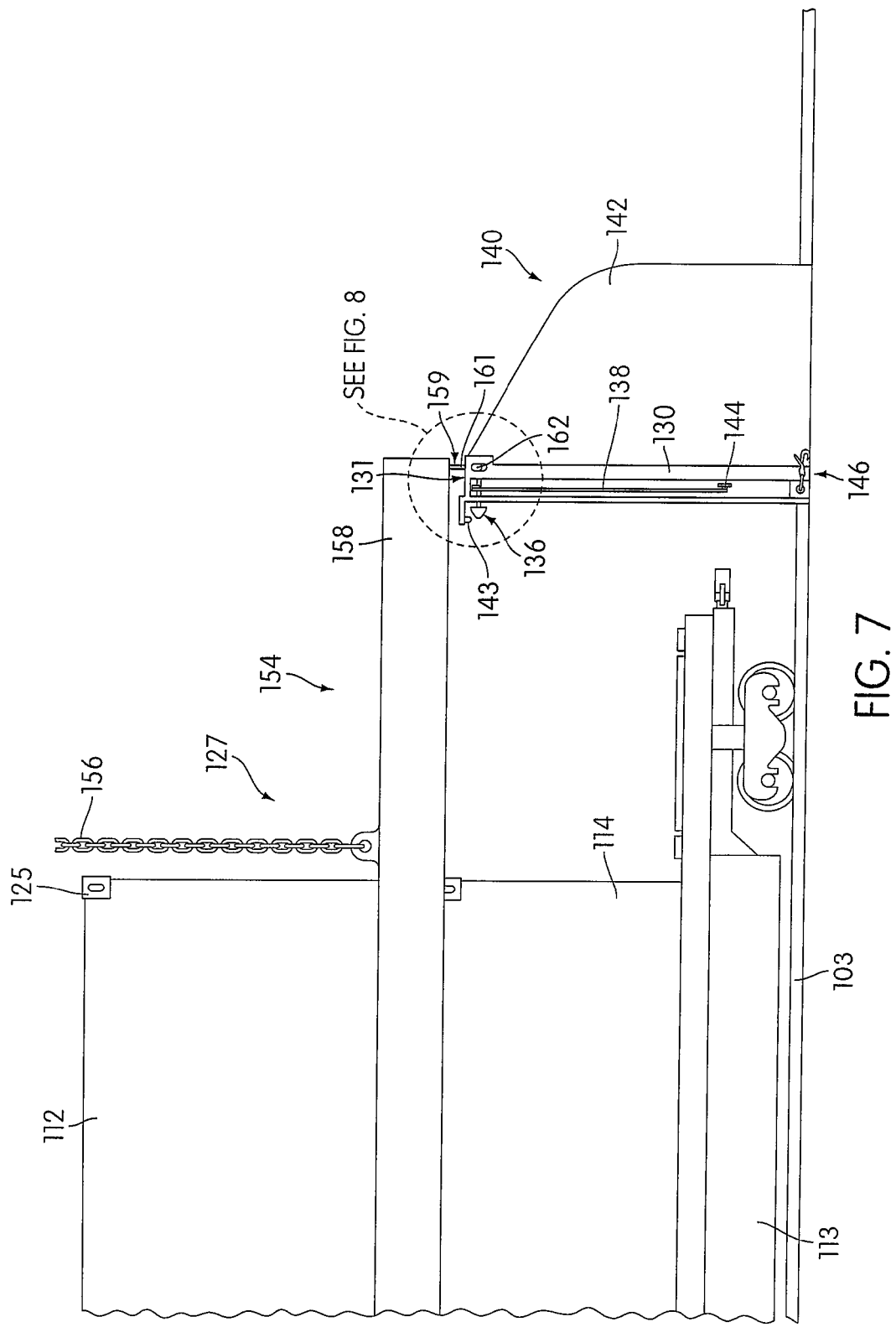

Lift device 154 may be a device that is known and/or exists in the rail or train yard, such as a spreader. For example, as shown in FIG. 6, the lift device 154 may comprise a spreader beam structure 158 which is attached to and suspended by a crane (not shown) via chains 156. As is known in the art, the spreader beam structure 158 may comprise a plurality of shapes. For example, in some embodiments, the spreader beam structure 158 is formed from a plurality of beams attached to form a generally rectangular shape. The structure 158 is built to any number of lengths and to accommodate the chains 156 at any number of angles. The lift device 154 is used to raise or lower containers as needed (e.g., such as when containers 112, 114 need to be stacked).

A rotatable or twist lock device 159 may be provided in each corner of the structure 158. The twist lock devices 159 extend downwardly in a direction toward the containers. Though the twist lock devices 159 are generally used to lift and move a container, the twist lock devices 159 may also be used for lifting the aerodynamic drag reducing device 140 and for assisting in attaching the device 140 to the top container 112. The twist lock devices 159 of the beam structure 158 may be similar to the twist lock devices and/or the first mounting device 136, described above. Utilizing the lift device 154 and spreader beam structure 158 for attachment of the drag reducing device 140 to the container 112 is beneficial as the lift device 154 and structure 158 are existing devices and no modifications need to be made to lift and mount the device 140.

Figure 8:
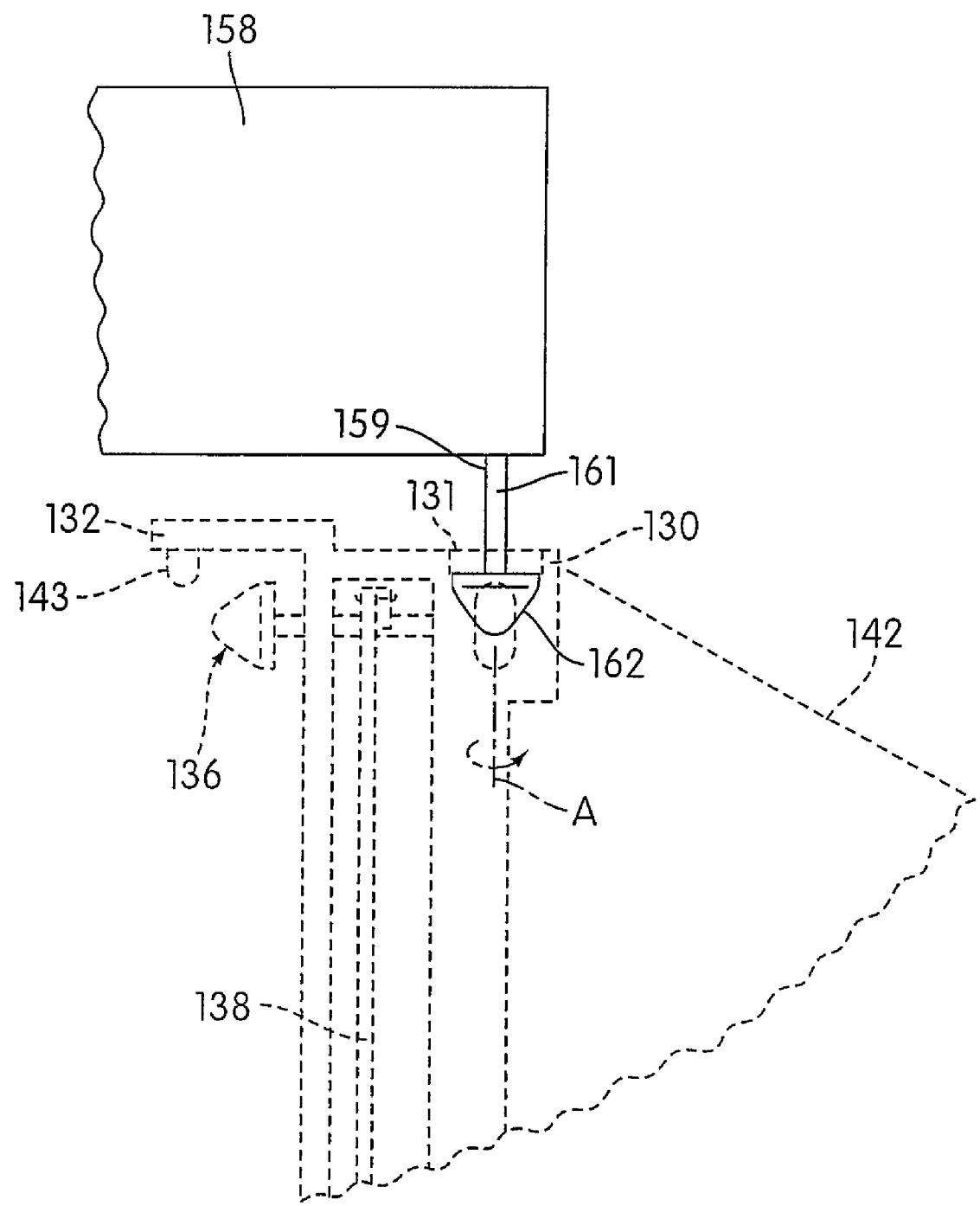
FIGS. 8 and 9 illustrate a detail view of a locking device for securing the attachment frame to the lift device in accordance with an embodiment of the present invention.
Figure 9:
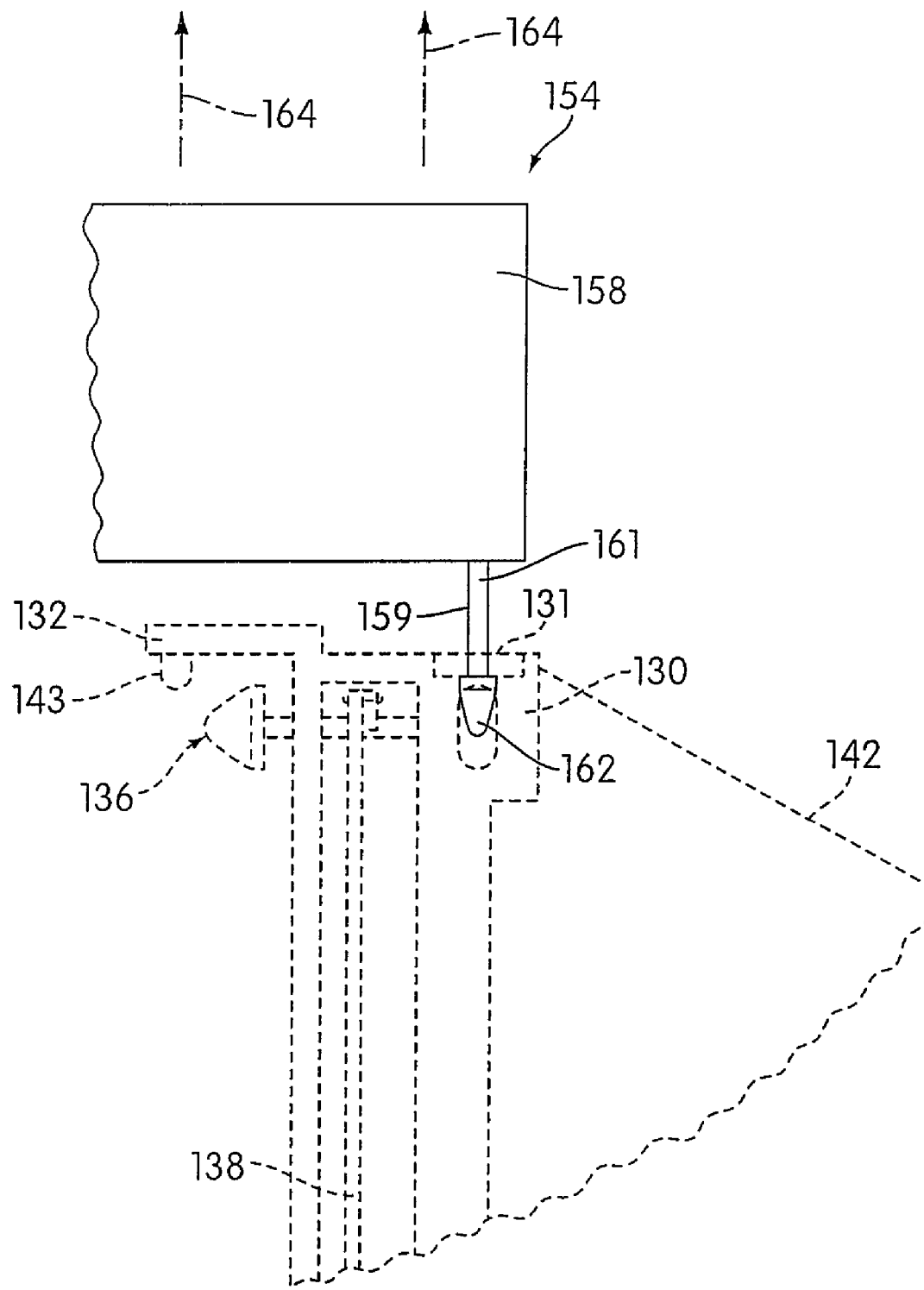

As shown and described in greater detail with respect to FIGS. 8-9, locking devices 159 comprise a rotatable base 161 in the form of a rotatable shaft and a locking head 162. A top end of the rotatable base 161 is attached to the structure 158 and extends downwardly therefrom, while the locking head 162 is provided at a bottom end of the base 161. The locking head 162 may comprise a tapered, oblong shape or any other shape as known in the art.

The rotatable base 161 maybe rotated by the operator or by ground personnel about an axis A between an unlocked position and a locked position. As noted above with respect to the first mounting device 136, when the rotatable base 161 is rotated, the locking head 162 is also rotated.

In some embodiments, one or more operators or personnel on the ground may assist the crane operator in aligning and/or inserting the mounting devices 136, 146 into the corner fittings 125.

Using the lift device 154 and spreader beam structure 158 to mount the drag reducing device 140 is advantageous for a number of reasons. For example, such equipment is existing in rail yards and thus need not require special devices for mounting the drag reducing device 140. Also, using the device 154 for lifting is particularly useful due to weight of the drag reducing device 140. Using such equipment also reduces the amount of effort and manpower required to attach the device 140. For example, in some embodiments, when attaching the drag reducing devices, only a crane operator and ground operator are required.

A method for attaching the drag reducing device 140 to a top container 112 is now described with respect to FIGS. 6-16. A set of containers comprising a top container 112 stacked on top of a bottom container 114 is provided on a stack car 113 on a rail 103. Generally the set of containers shown in FIG. 6 is assembled to be the first set 106 of containers of a plurality of containers designed to be attached to a locomotive and form a train (such as train 100) within a rail yard that are being assembled and prepared for travel. To attach the aerodynamic drag reducing device 140 to the top container 112 of the first set 106 of containers, the lift device 154 is lowered by a crane operator toward the device 140. The twist lock devices 159 extending from the structure 158 are aligned with the openings 131a in the top of the corner assemblies 131 of the device 140 located at each top corner. After the twist lock devices 159 are aligned, the lift device 154 may then be lowered such that the locking heads 162 of each twist lock device 159 are inserted into the top openings 131a of the corner assemblies 131. The twist lock devices 159 are then locked as illustrated in FIGS. 8-9. Specifically, the rotatable base 161 rotates about an axis A in a first direction so as to turn the locking head 162 from an unlocked position as shown in FIG. 8 to a locked position as shown in FIG. 9 (i.e., out of alignment with the openings 131a). The structure 158 then has the aerodynamic drag reducing device 140 securely attached to at least one end. The structure 158 is then lifted in an upward direction 164 toward the top container 112 of the stacked containers.

Figure 10:
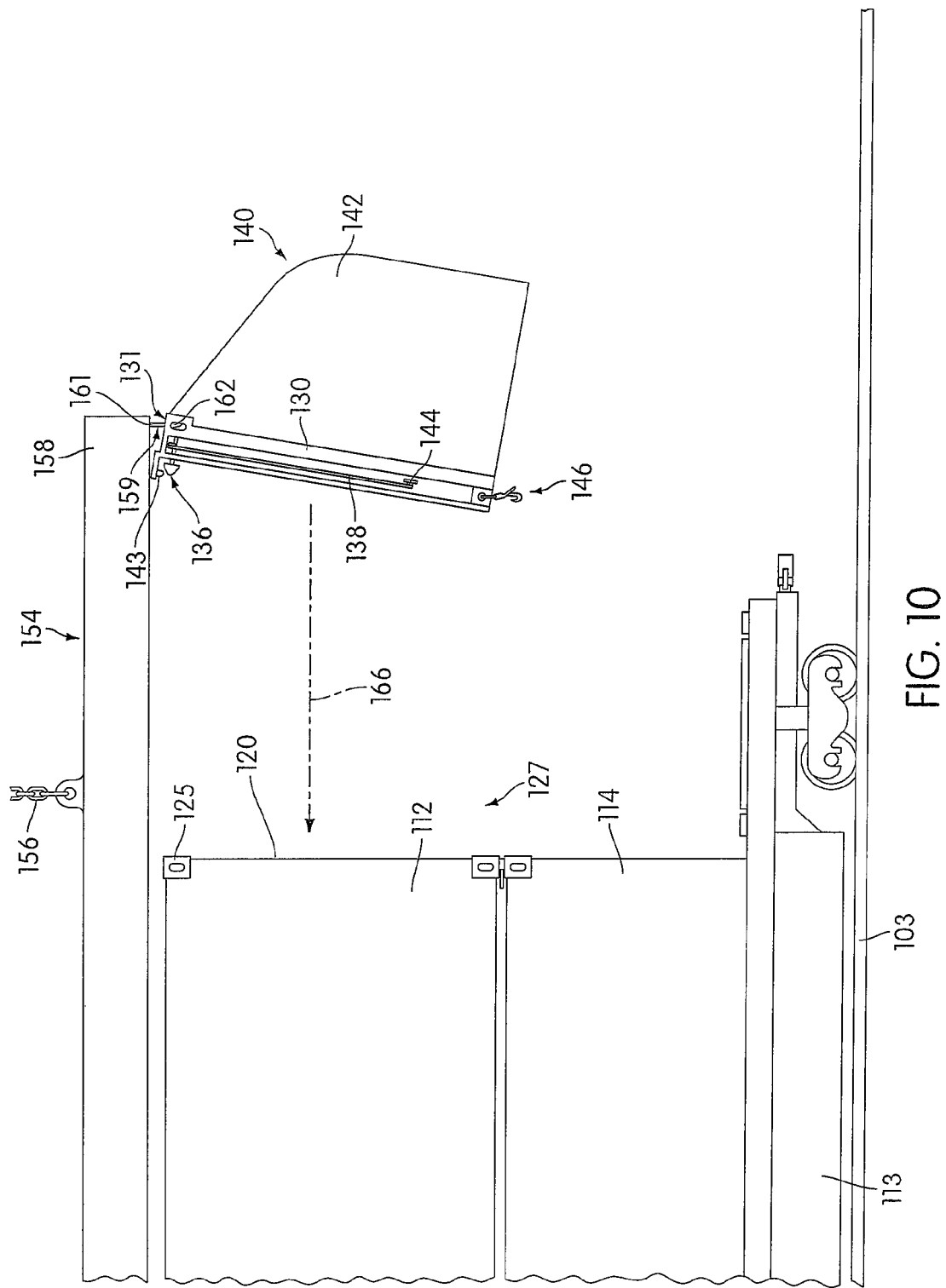
FIGS. 10-12 illustrate side views showing the attachment of the aerodynamic drag reducing device to the top container of the set of containers in accordance with an embodiment of the present invention.
Figure 11:
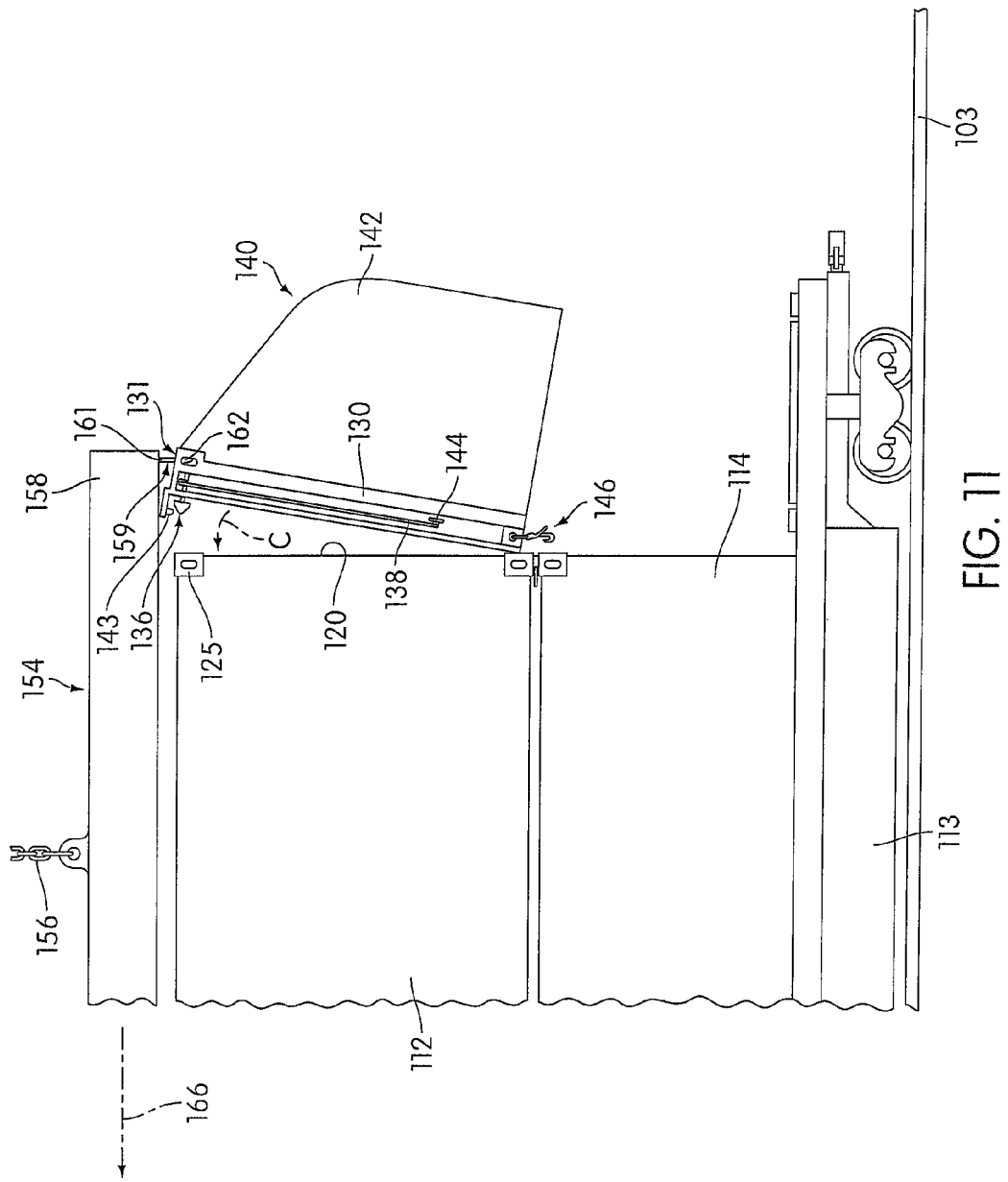
Figure 12:
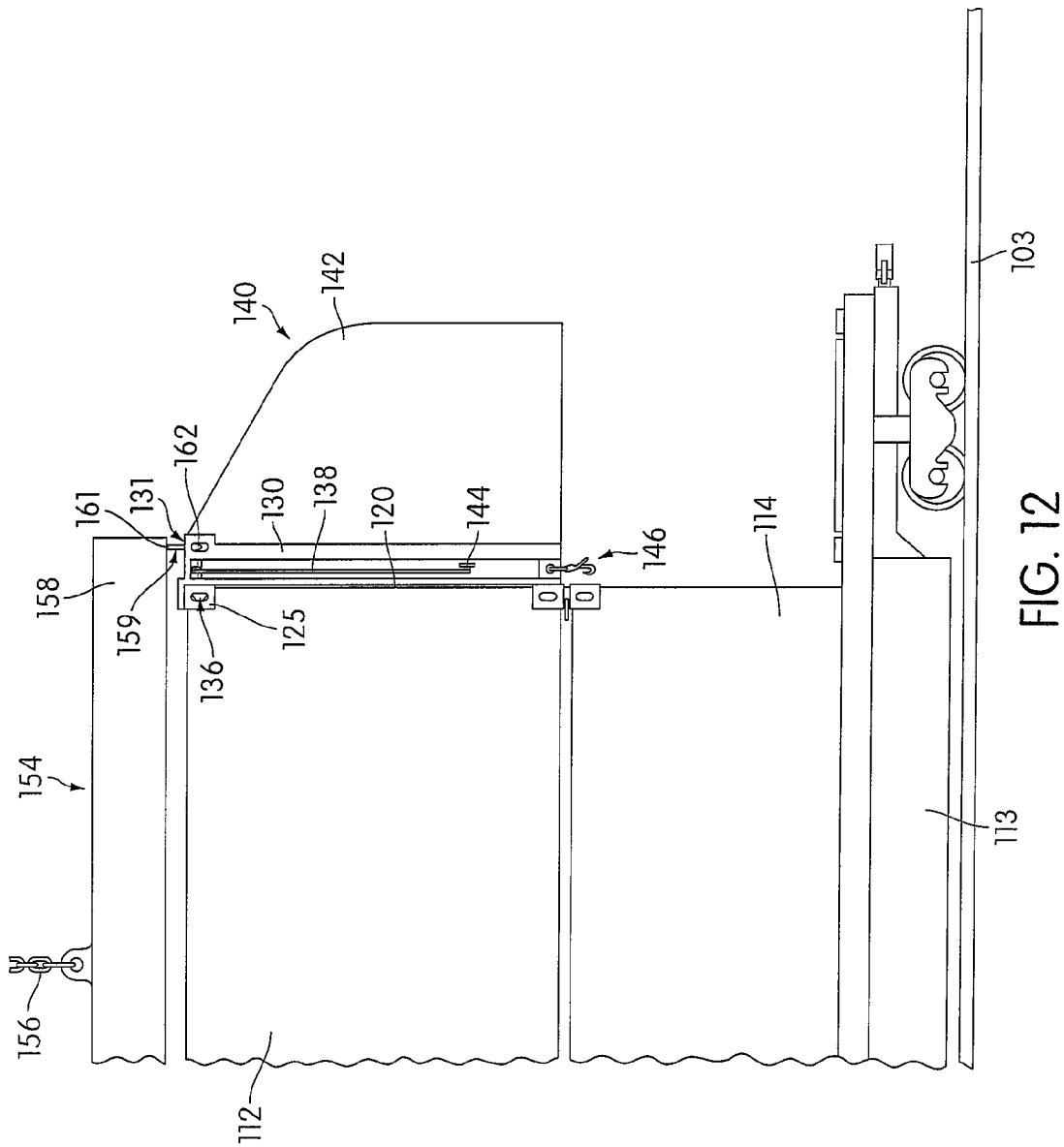

The lift device 154 and structure 158 are raised to an appropriate height such that the attachment frame 130 is substantially in line with the top container 112. The lift device 154 is then directed in a direction 166 toward the front wall 120 located at the first end 127 of the container 112, as shown in FIG. 10. The lift device 154 is moved and positioned until the fairing 142 is aligned with the front wall 120 of the container 112 and the attachment frame 130 is substantially flush with the front wall 120. For example, a bottom edge of the attachment frame 130 may come into contact with the bottom of the container 112, as shown in FIG. 11. The lift device 154 may then be directed in direction 166 to further align and then pivot the device 140 in a direction C such that the attachment frame 130 is flush with the front wall 120 of the top container 112. FIG. 12 shows that upon proper alignment of the device 140, the first mounting devices 136 are inserted into the openings 125a. After the first mounting devices 136 are inserted into the connection openings 125a, the first mounting devices 136 is rotated from an unlocked position to a locked position. More specifically, as shown in FIG. 13, the locking head 141 of the first mounting device 136 is inserted into the corner fittings 125. An operator (such as ground personnel) then pulls on toggle handle 144 in a downward direction E to move the toggle arm 158 downwardly and thus rotate rotatable base 139. The rotatable base 139 and locking head 141 are rotated about axis D from an unlocked position to a locked position.

Figure 14:
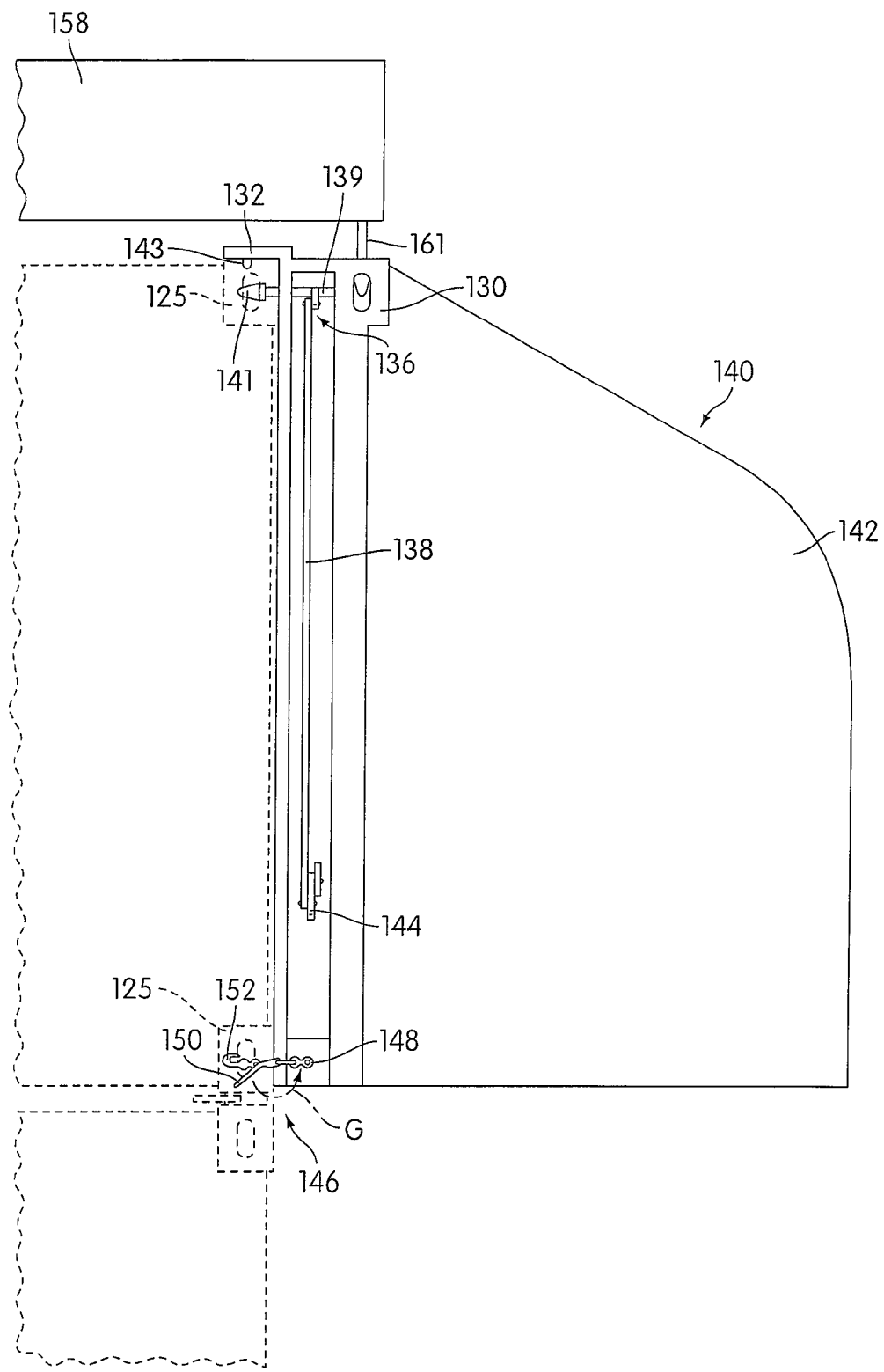
Figure 15:
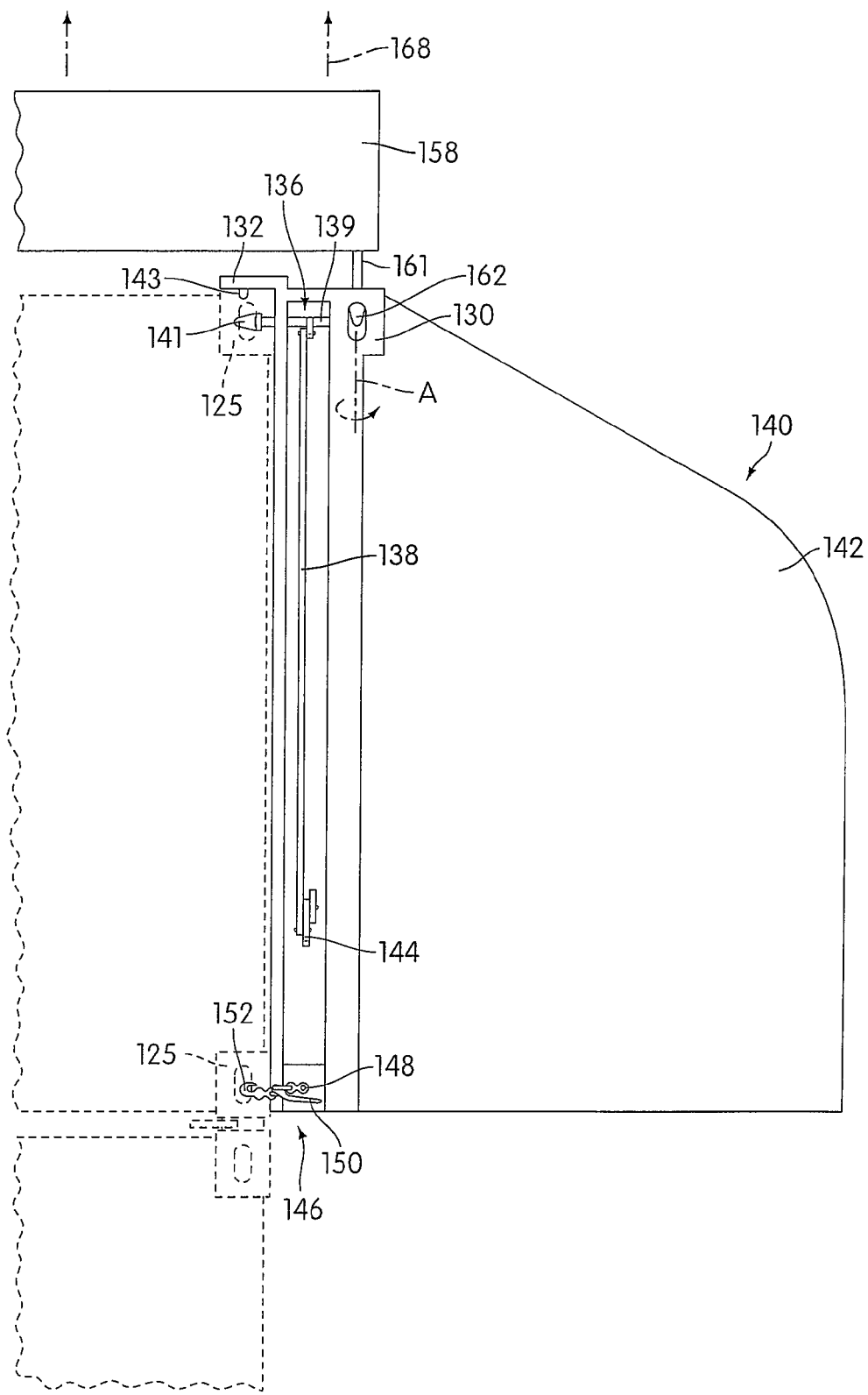
FIG. 15 illustrates a detailed side view of removing the lift device from the aerodynamic drag reducing device.

After the mounting device 136 is fully inserted and locked, the second mounting devices 146 are pivoted via linkage 148 in direction B such that the hook ends 152 may be at least partially inserted into the connection openings 125a on the side wall 116 of the top container 112. Then, as shown in FIG. 14, the operator may pull handle 150 in a direction G to tighten the grip of the hook within the opening 125a. The direction G in which handle 150 is pulled may be in a direction substantially parallel to a horizontal axis, or rotated about a pivot axis. The drag reducing device 140 is then securely attached to the top container 112 of the first, leading set 106 of containers.

Figure 16:
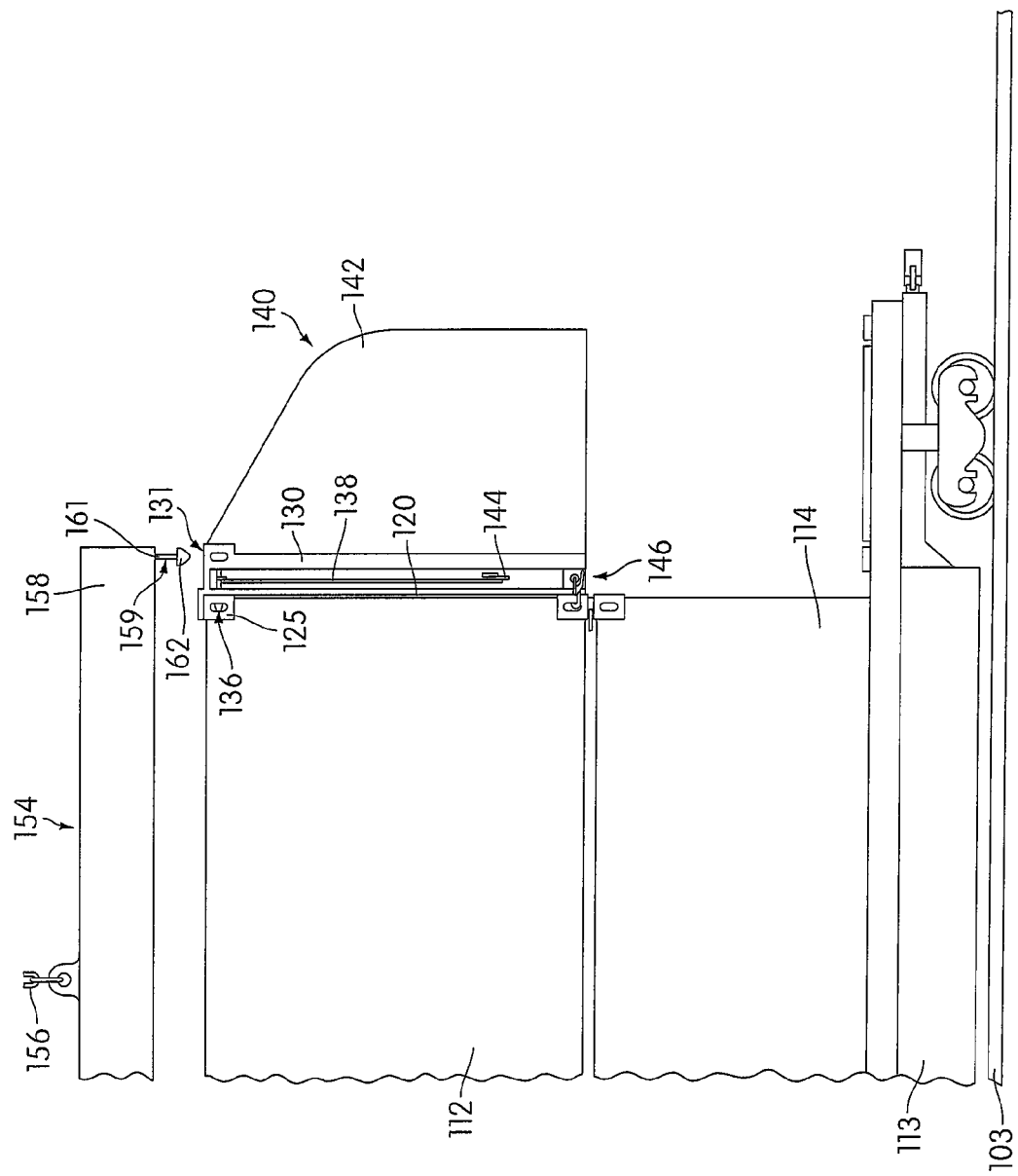
FIG. 16 illustrates a side view of the aerodynamic drag reducing device attached to the top container of a set of containers in accordance with an embodiment of the present invention.

The rotatable base 161 of the twist lock device 159 is then rotated about axis A in a second, opposite direction such that the locking head 162 is in an unlocked position (i.e., so the heads 162 are aligned with the openings 131a and can be removed or withdrawn). The structure 158 is then lifted in an upward direction 168 to remove the lift device 154 from the attachment frame 130 of the device 140, as shown in FIG. 16. A locomotive such as locomotive 102 may then be attached to the car 113 and the train 100 is ready for travel.

Generally it should be understood that drag reducing device 140 may be mounted as a tail 170 in a similar manner as described in FIGS. 6-16 and should not be limited.

The aerodynamic drag reducing device 140 provides several advantageous features. For example, a properly designed fairing, such as fairing 142, securely attached to a first, leading set 106 of containers will significantly reduce aerodynamic drag at a front end of the train when moving in a forward direction 134. Additionally or alternatively, the drag reducing device 140 may be attached to a second set 108 of containers, such as a trailing set, to reduce the aerodynamic drag provided by a rear section of the train 100. Such a reduction in aerodynamic drag and vortices thus provides the potential to reducing fuel consumption. A small reduction in fuel consumption, such as one percent, may equate to a reduction of running costs by several million dollars annually for a large rail operator. Additionally, the device 140 itself does not create significant lift and is low in cost to produce.

The drag reducing device 140 is also advantageous as it is designed such that it may be easy to install by operators as the container need not be adjusted or modified since it uses existing holes and openings (e.g., corner fittings 125) and equipment (e.g., lift device 154 and spreader beam 158). The device 140 also allows for simplified installation (or removal) without risk of harm or injury to the fairing 142, the container, or the operators. In an embodiment, the aerodynamic drag reducing device 140 may be a removable structure that may be attached to any number of top containers in a set of stacked intermodal containers.

Figure 17:
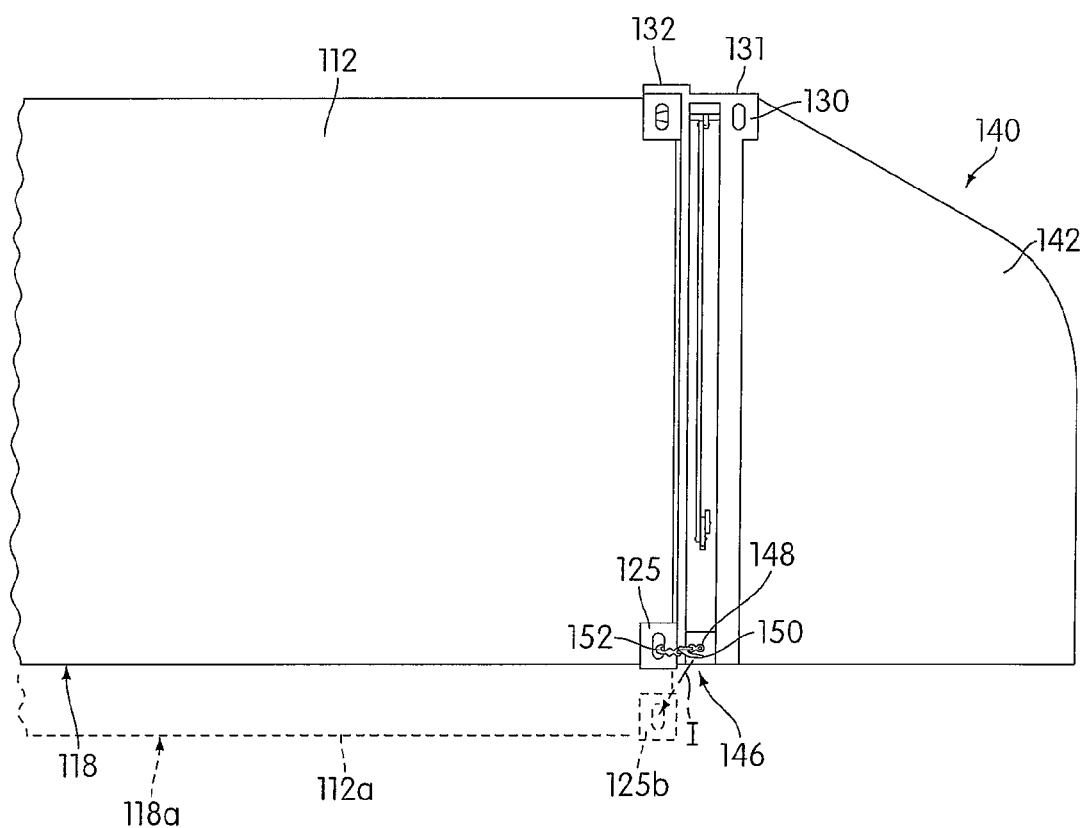
FIG. 17 illustrates a method of using the second mounting device with containers of different heights in accordance with an embodiment of the present invention.

The use of the first mounting device 136 and second mounting device 146 also provide several advantages. As noted above, first mounting devices 136 and second mounting devices 146 comprise structures that are generally known in the art. The first mounting device 136 provides a locking device that is similar to the known twist lock structure; however, the lock is altered to rotate about a horizontal axis. The second mounting device 146 is also advantageous as it may be easily adjusted to fit to containers of differing dimensions. For example, as shown in FIG. 17, the second mounting device may be mounted in a lower corner fitting 125 of a standard intermodal or ISO container having a first height, such as 8 feet, 6 inches. However, the second mounting device 146 may be easily moved to a container 112a having differing dimensions, such as a height of 9 feet, 6 inches. The second mounting device 146 may be easily pulled in a direction I toward the corner fitting 125b and securely attached in the lower corner fitting 125a. Though container 112a has a side wall 118a of greater height, the corner fittings 125b allow one to easily adjust the mounting devices and attach them thereto.

Figure 18:
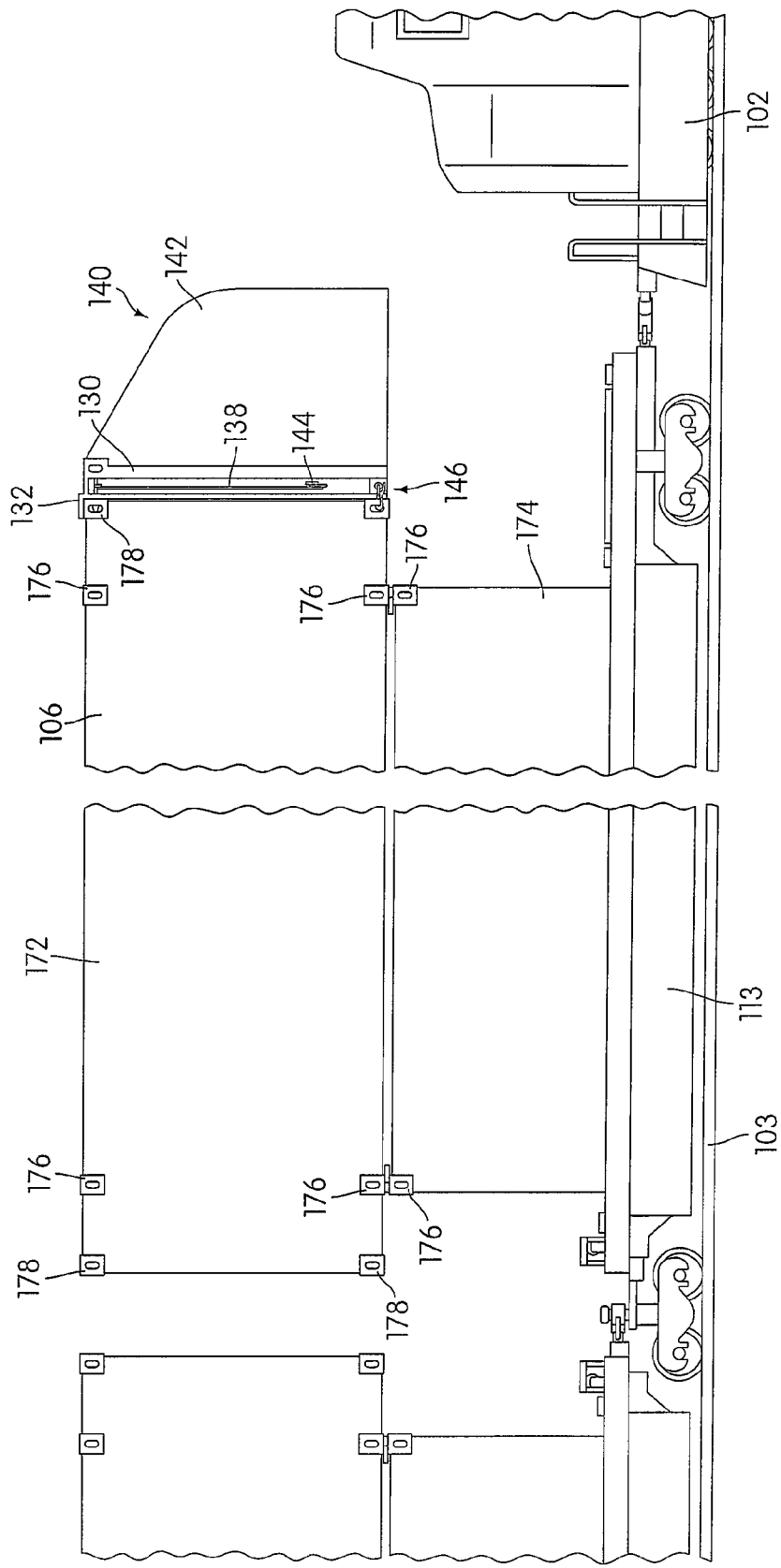
FIG. 18 illustrates an aerodynamic drag reducing device attached to a top container having a different length than a bottom container in set of containers in accordance with an embodiment of the present invention.

In some embodiments, containers of different dimensions may be stacked. For example, as shown in FIG. 18, a top container 172 having a different length than a bottom container 174 may form a first set 106 of containers. Forming such stacks is generally known in the art. Containers 172 of greater length therefore, generally comprise two sets of corner fittings 176 and 178. Corner fittings 176 and 178 may be equivalent to corner fittings 125 as described above, and are generally known in the art. As shown in FIG. 18, corner fittings 176 are provided at a distance from the front wall of the container that allows the top container 172 to be aligned and locked with the bottom container via the fittings 176. Additionally, container 172 comprises corner fittings 178. The drag reducing device 140 may be attached to the corner fittings 178 of the container 172 as described above.

FIGS. 17 and 18 illustrate two additional advantages of the attachment frame 130 and first and second mounting devices 136 and 146. The frame 130 is designed to fit any number of alternate dimensions (e.g., height or width) of intermodal containers. Because the spacing between the connection openings 125a in each corner fitting 125a on the front wall 120 and back wall 122 are set via ISO standards (e.g., 7 feet, 4 and 31/32 inches), the mounting devices 136 and 146 will require little adjustment. Thus, the drag reducing device 140 as provided herein may be attached to any size container having corner fittings.

While the principles of the invention have been made clear in the illustrative embodiments set forth above, it will be apparent to those skilled in the art that various modifications may be made to the structure, arrangement, proportion, elements, materials, and components used in the practice of the invention.

For example, in addition to any of the above mentioned features, in some embodiments, standard ISO containers may comprise an attachment area known as a tunnel or gooseneck tunnel (not shown), extending from a first end 127 of the container toward a second end 128 of the container. In an embodiment, the tunnel may include frame members on either side to define the gooseneck tunnel. The tunnel is traditionally designed to receive or accommodate a part of an over-the-road trailer or chassis.

Additionally, any of the noted locking devices, such as first mounting device 136 and second mounting device 146, may be retractable. Also, the directions and ranges of which the devices may twist, rotate, or pivot should not be limiting. In some embodiments, one or more devices may be provided on or within the attachment frame 130 to prevent movement of the first and/or second locking devices 136, 146 from moving from a locked position (or unlocked position). Such device(s) would be particularly advantageous during movement transport of the stacks by the train 100, as some movements may accidentally or inadvertently rotate or unlock the mounting devices 136, 146.

Also, additional aerodynamic reducing devices, such as curtains 160 shown in FIG. 2, may be used with train 100. Curtains 160 generally have a first end attached to back walls 122 of a first set of containers (e.g., containers 106 or containers 110) and a second end attached to front walls 120 of a second set of containers (e.g., containers 110 or containers 108). The curtains 160 may comprise any sort of design or shape and may be attached any number of ways to the containers.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A method for reducing aerodynamic drag of a series of stacked intermodal containers, the series having at least a first set of containers, the set of containers comprising a top container stacked above a bottom container; each of the containers comprising a top wall, a bottom wall, end walls, and side walls connected by a frame to form a box with corners at each junction of three of the walls, and each container having corner fittings at each corner associated with at least a first of the end walls thereof, the corner fittings comprising a plurality of connection openings each configured to receive a part of a mounting device, the method comprising:
providing an aerodynamic drag reducing device comprising a drag reducing fairing and an attachment frame, the fairing being attached to the attachment frame, and
removably mounting the attachment frame to the top container of the first set of containers at the first end wall having the corner fittings associated therewith using a first mounting device and a second mounting device, each mounting device extending from the attachment frame and into at least one of the connection openings of the corner fittings associated with the at least first of the end walls of the top container of the first set of containers.

2. A method according to claim 1, wherein the first set of containers is a leading set of containers in the series and the first end wall of the top container of the first, leading set is a front wall facing a forward direction, and wherein the first and second mounting devices connect to the corner fittings at the front wall of the top container of the first, leading set such that the aerodynamic drag reducing device faces the forward direction for forward movement.

3. A method according to claim 2, wherein the first mounting device further comprises a rotatable locking device, and wherein the method further comprises releasably securing the attachment frame to the corner fittings by rotating the rotatable locking device.

4. A method according to claim 3, further comprising rotating the rotatable locking device from an unlocked position to a locked position via a toggle arm.

5. A method according to claim 2, further comprising latching hooks of the second mounting device into at least one connection opening of the corner fittings.

6. A method according to claim 5, further comprising pivoting a leverage handle of the second mounting device from a first position to a second position so as to securely fasten the hooks in the connection openings of the corner fittings.

7. A method according to claim 1, further comprising removably mounting the first mounting device to the connection openings located in top corners of the top container and removably mounting the second mounting device to the connection openings located in bottom corners of the top container.

8. A method according to claim 7, wherein the connection openings in the top corners are adjacent the first of the end walls of the top container and wherein the connection openings in the bottom corners are adjacent the side wall of the top container.

9. A method according to claim 8, further comprising securing the attachment frame to the corner fittings by rotating a rotatable locking device.

10. A method according to claim 1, further comprising providing a second, aerodynamic drag reducing device comprising a second drag reducing fairing and a second attachment frame, and removably mounting the second attachment frame using third and fourth mounting devices which extend from the second attachment frame and into at least one of the connection openings of corner fittings in each corner of a top container of a second set of containers.

11. A method according to claim 1, further comprising:
   positioning the aerodynamic drag reducing device in relation to the top container;
   aligning the attachment frame with the corner fittings of the top container;
   inserting at least the first mounting device into at least one connection opening of a first corner fitting, and
   securing at least the first mounting device in the at least one connection opening.

12. A method according to claim 11, further comprising:
   inserting the second mounting device into a second connection opening of a second corner fitting, and
   securing the second mounting device in the second connection opening.

13. A method according to claim 1, wherein the series of stacked intermodal containers are attached to a locomotive in a train.

14. A method according to claim 1, wherein the first set of containers is a trailing set of containers in the series and the first end wall of the top container of the first, trailing set is a back wall facing a rearward direction, and wherein the first and second mounting devices connect to the corner fittings at the back wall of the top container of the first, trailing set such that the aerodynamic drag reducing device faces the rearward direction that is opposite a direction for forward movement.

* * * * *